(12) United States Patent
Park et al.

(10) Patent No.: US 12,441,078 B2
(45) Date of Patent: Oct. 14, 2025

(54) METAL ARCHITECTURED PLATE WITH TACTILE WARMTH AND ELASTICITY AND MANUFACTURING METHOD THEREFOR

(71) Applicant: KOREA INSTITUTE OF INDUSTRIAL TECHNOLOGY, Cheonan (KR)

(72) Inventors: Jae Young Park, Gunpo-si (KR); Tai Hong Yim, Gyeonggi-do (KR); Min Su Lee, Siheung-si (KR); Ho Hyeong Kim, Siheung-si (KR)

(73) Assignee: KOREA INSTITUTE OF INDUSTRIAL TECHNOLOGY, Cheonan (KR)

( * ) Notice: Subject to any disclaimer, the term of this patent is extended or adjusted under 35 U.S.C. 154(b) by 251 days.

(21) Appl. No.: 17/780,854

(22) PCT Filed: Nov. 27, 2020

(86) PCT No.: PCT/KR2020/017186
§ 371 (c)(1),
(2) Date: May 27, 2022

(87) PCT Pub. No.: WO2021/107718
PCT Pub. Date: Jun. 3, 2021

(65) Prior Publication Data
US 2023/0001666 A1    Jan. 5, 2023

(30) Foreign Application Priority Data

Nov. 28, 2019 (KR) .......................... 10-2019-0155127
Oct. 8, 2020 (KR) .......................... 10-2020-0129785

(51) Int. Cl.
*B32B 3/30* (2006.01)
*B32B 3/26* (2006.01)
(Continued)

(52) U.S. Cl.
CPC ................ *B32B 3/30* (2013.01); *B32B 3/263* (2013.01); *B32B 15/01* (2013.01); *B32B 37/10* (2013.01);
(Continued)

(58) Field of Classification Search
CPC ........... B32B 3/30; B32B 3/263; B32B 15/01; B32B 37/10; B32B 15/18; B32B 15/20;
(Continued)

(56) References Cited

U.S. PATENT DOCUMENTS 5,795,658 A * 8/1998 Bode ........................ B01J 35/56
428/603
5,800,905 A * 9/1998 Sheridan ................. F16L 59/08
156/251

FOREIGN PATENT DOCUMENTS

JP    H09220486 A    8/1997
JP    4330972 B2    9/2009
(Continued)

*Primary Examiner* — Maria V Ewald
*Assistant Examiner* — Ethan Weydemeyer

(57) ABSTRACT

An embodiment of the present disclosure provides a metal architectured plate with senses of tactile warmth and elasticity. According to an embodiment of the present disclosure, there is an effect that it is possible to provide a metal architectured plate with senses of tactile warmth and elasticity which is configured by stacking sheet-like metal architectured materials having micro-thickness with senses of tactile warmth and elasticity, the metal architectured materials including base microchannels formed with regular intervals; and microchannels with senses of tactile warmth and elasticity formed to protrude between the base microchannels, such that the base microchannels and the microchannels with senses of tactile warmth and elasticity form channels with senses of tactile warmth and elasticity, which are spaces for allowing control of thermal conductivity and (Continued)

an elastic modulus, thereby imparting human-friendly senses of tactile warmth and elasticity.

15 Claims, 18 Drawing Sheets

(51) Int. Cl.
    *B32B 15/01*     (2006.01)
    *B32B 37/10*     (2006.01)
    *B32B 15/18*     (2006.01)
    *B32B 15/20*     (2006.01)

(52) U.S. Cl.
    CPC ............... *B32B 15/18* (2013.01); *B32B 15/20* (2013.01); *B32B 2307/302* (2013.01); *B32B 2307/51* (2013.01); *B32B 2307/54* (2013.01); *B32B 2307/732* (2013.01)

(58) Field of Classification Search
    CPC .......... B32B 2307/302; B32B 2307/51; B32B 2307/54; B32B 2307/732
    See application file for complete search history.

(56) References Cited

FOREIGN PATENT DOCUMENTS

| | | |
|---|---|---|
| KR | 100229363 B1 | 11/1999 |
| KR | 20150034393 A | 4/2015 |
| WO | WO2014055991 A1 | 4/2014 |

\* cited by examiner

| THICKNESS | ADDITIONAL STACKING | SPACING RATIO(x : y) / THERMAL CONDUCTIVITY(W/m·K) | | |
|---|---|---|---|---|
| | | 1 | 2 | 4 |
| 50 | 0 | 1.261 | 0.586 | 0.288 |
| | 1 | 1.177 | 0.532 | 0.234 |
| | 2 | 1.242 | 0.573 | 0.26 |
| 40 | 0 | 0.97 | 0.44 | 0.197 |
| | 1 | 0.882 | 0.393 | 0.171 |
| | 2 | 0.953 | 0.436 | 0.194 |
| 30 | 0 | 0.684 | 0.307 | 0.134 |
| | 1 | 0.621 | 0.268 | 0.115 |
| | 2 | 0.683 | 0.305 | 0.134 |

METAL ARCHITECTURED PLATE WITH TACTILE WARMTH AND ELASTICITY AND MANUFACTURING METHOD THEREFOR

TECHNICAL FIELD

The present disclosure relates to metal laminates with senses of tactile warmth and elasticity and, more particularly, to a metal architectured plate with senses of tactile warmth and elasticity, which is manufactured by performing architecturing on a metal material to have a structure that gives human-friendly senses of tactile warmth and elasticity by reproducing the microstructure and textural characteristics of natural matters (e.g., wood).

BACKGROUND ART

In general, advanced materials refer to materials that compensate for defects of existing materials and improve advantages of those materials with manufacturing technologies or processing technologies developed based on existing materials or new materials or that have new characteristics that have not existed up to now.

Recently, research for developing such advanced materials has been actively conducting. Among others, a study of metal materials that are used in various ways as the surface materials of not only the exterior materials of IT•electronic products or the interior/exterior materials of motor vehicles but also the interior/exterior materials for construction•interior construction has been actively conducting.

Such metal materials have an advantage of providing products with an elegant aesthetic sense or a sense of luster and having high durability. However, metal materials of the prior art have a disadvantage that they are heavy in comparison to aluminum, plastic, and fiber glass reinforce plastic (FRP) due to their high specific weight and they give a cold sense of touch without giving a sense of stability to people like foam, cork, rubber, wood, or leather.

In order to solve the problems as described above, a study of developing advanced metal materials realizing sensitivity that gives a sense of stability to people has been actively conducting recently.

However, metal materials realizing such sensitivity in the prior art are limited to products showing a visual effect related to colors, so developing a metal material that can realize senses of touch such as senses of tactile warmth and elasticity that give a sense of stability to people is insufficient.

To this end, there was a technique intended to use the advantages of ductility and rigidity of metals for fiber, etc. by applying the technique of attaching a net structure to a raw carbon fiber in close contact state to reinforce the strength of a carbon fiber in the field of carbon fiber reinforce plastic (CFRP). See, Korean registered patent No. 10-1961103. However, up till now, there is no technology that allows the metal itself to provide senses of tactile warmth and elasticity that are human-friendly senses of touch.

Further, there were several attempts to provide a sense of touch by forming a pore structure in a metal material. However, the techniques of the prior art have problems in that such metal materials have low durability, limitative use, and difficulty in mass production because their physical properties are not uniform due to non-uniform pore structure and structural problems.

Accordingly, it is increasingly required to develop a metal architectured plate with senses of tactile warmth and elasticity and an architecturing method that can improve a structure to have ductility and strength, which are advantages of metal, and have senses of tactile warmth and elasticity that are human-friendly senses of touch.

SUMMARY OF INVENTION

Technical Problem

An objective of the present disclosure is to provide a metal architectured plate with senses of tactile warmth and elasticity, the metal architectured plate being able to solve the problem that metal materials of the prior art cannot provide senses of touch such as senses of tactile warmth and elasticity which give a sense of stability to people even though they have several advantages such as high ductility and strength, an excellent energy absorption ratio, etc., and being able to realize non-cold metal and a soft sense of touch depending on necessities of consumer, and a method of manufacturing the metal architectured plate.

Another objective of the present disclosure is to provide a metal architectured plate with senses of tactile warmth and elasticity, the metal architectured plate having structural stability and high durability and having a sense of stability by reproducing the microstructure and textural characteristics of natural matters, particularly, wood.

The objectives to implement in the present disclosure are not limited to the technical problems described above, and other objectives that are not stated herein will be clearly understood by those skilled in the art from the following descriptions.

Solution to Problem

In order to achieve the objectives, an embodiment of the present disclosure provides a metal architectured plate with senses of tactile warmth and elasticity.

In an embodiment of the present disclosure, the metal architectured plate with senses of tactile warmth and elasticity is configured by stacking sheet-like metal architectured materials having micro-thickness with senses of tactile warmth and elasticity, the metal architectured materials including base microchannels formed with regular intervals; and microchannels with senses of tactile warmth and elasticity formed to protrude between the base microchannels, such that the base microchannels and the microchannels with senses of tactile warmth and elasticity form channels with senses of tactile warmth and elasticity, which are spaces for allowing control of thermal conductivity and an elastic modulus.

The thickness of the metal architectured material with senses of tactile warmth and elasticity may be 3 μm to 100 μm.

The ratio of the width of the microchannel with senses of tactile warmth and elasticity and the width of the base microchannel may be 1:10 to 10:1.

The microchannel with senses of tactile warmth and elasticity may include: a pair of slopes protruding at a predetermined contact angle from ends of each side of the base microchannel; and a ridge connecting ends of the pair of slopes that are opposite to the ends connected to the base microchannel.

The width of the base microchannel may be 5 μm to 5000 μm.

The width of the ridge may be 1 μm to 4000 μm.

The contact angle may be an angle made by the slope and the ridge or the base microchannel and may be 0° to 90°.

In the metal architectured plate with senses of tactile warmth and elasticity, the metal architectured materials with senses of tactile warmth and elasticity may be stacked such that the ridge of the microchannel with senses of tactile warmth and elasticity of one metal architectured material with senses of tactile warmth and elasticity is in contact with the bottom of the base microchannel of another metal architectured material with senses of tactile warmth and elasticity to form the channel with senses of tactile warmth and elasticity.

A first metal architectured material with senses of tactile warmth and elasticity in which the ratio of the width of the microchannel with senses of tactile warmth and elasticity and the width of the base microchannel is 1:2n–(n is an integer of 1 or more), and a second metal architectured material with senses of tactile warmth and elasticity in which the ratio of the width of the microchannel with senses of tactile warmth and elasticity and the width of the base microchannel is 1:2n (n is an integer of 1 or more) may be alternately stacked.

In order to achieve the objectives, another embodiment of the present disclosure provides a metal architectured plate with senses of tactile warmth and elasticity.

In an embodiment of the present disclosure, the metal architectured plate with senses of tactile warmth and elasticity is configured by stacking sheet-like metal architectured materials having micro-thickness with senses of tactile warmth and elasticity to form channels with senses of tactile warmth and elasticity, which are spaces for allowing control of thermal conductivity and a sense of tactile warmth.

The metal architectured materials with senses of tactile warmth and elasticity may include: a plurality of base microchannels formed with regular intervals; and a plurality of first microchannels with senses of tactile warmth and elasticity that are formed to protrude between the base microchannels.

The first microchannel with senses of tactile warmth and elasticity is formed in a stepped shape including a second microchannel with senses of tactile warmth and elasticity protruding from the first microchannel with senses of tactile warmth and elasticity and having a width smaller than that of the first microchannel with senses of tactile warmth and elasticity.

The metal architectured materials with senses of tactile warmth and elasticity are stacked such that the first microchannels with senses of tactile warmth and elasticity are spaced apart so as not to overlap each other.

The metal architectured materials with senses of tactile warmth and elasticity may have a plurality of microchannels with senses of tactile warmth and elasticity sequentially repeatedly protrude from the second microchannel with senses of tactile warmth and elasticity to be formed in a stepped shape in the same way that the second microchannel with senses of tactile warmth and elasticity protrudes from the first microchannel with senses of tactile warmth and elasticity.

The first microchannel with senses of tactile warmth and elasticity may include: a pair of first slopes protruding at a predetermined contact angle from ends of each side of the base microchannel; and a first ridge connecting ends of the pair of first slopes that are opposite to the ends connected to the base microchannel.

The second microchannel with senses of tactile warmth and elasticity may include: a pair of second slopes protruding at a predetermined contact angle from the first ridge; and a second ridge connecting ends of the pair of slopes that are opposite to the ends connected to the first ridge.

The metal architectured materials with senses of tactile warmth and elasticity may be stacked such that the second ridge of one metal architectured material with senses of tactile warmth and elasticity is in contact with the bottom of the base microchannel of another metal architectured material with senses of tactile warmth and elasticity to form the channel with senses of tactile warmth and elasticity.

The thickness of the metal architectured material with senses of tactile warmth and elasticity may be 10 μm to 100 μm.

The thermal conductivity of the metal architectured plate with senses of tactile warmth and elasticity having the above configuration of the present disclosure may be 0.05 W/m·K to 10 W/m·K.

The elastic modulus of the metal architectured plate with senses of tactile warmth and elasticity may be 0.1 MPa to 10 GPa.

In order to achieve the objectives, another embodiment of the present disclosure provides a method of manufacturing a metal architectured plate with senses of tactile warmth and elasticity.

In an embodiment of the present disclosure, the method of manufacturing a metal architectured plate with senses of tactile warmth and elasticity comprises: manufacturing sheet-like metal architectured materials having micro-thickness with senses of tactile warmth and elasticity, wherein the metal architectured materials include base microchannels formed with regular intervals and microchannels with senses of tactile warmth and elasticity formed to protrude between the base microchannels; stacking the metal architectured materials with senses of tactile warmth and elasticity such that the base microchannels and the microchannels with senses of tactile warmth and elasticity form channels with senses of tactile warmth and elasticity that are spaces for allowing control of thermal conductivity; and attaching the stacked metal architectured materials with senses of tactile warmth and elasticity together through pressing.

The microchannel with senses of tactile warmth and elasticity in the manufacturing of metal architectured materials with senses of tactile warmth and elasticity may be manufactured such that metal architectured materials include: a pair of slopes protruding at a predetermined contact angle from ends of each side of the base microchannel; and a ridge connecting ends of the pair of slopes that are opposite to the ends connected to the base microchannel.

The step of attaching the stacked metal architectured materials with senses of tactile warmth and elasticity together through pressing may be performed by means of a spacer having a target thickness of the metal architectured plate with senses of tactile warmth and elasticity.

Advantageous Effects of Invention

According to the present disclosure, it is possible to provide a metal architectured plate with senses of tactile warmth and elasticity that is structurally stable because it has a regular internal pore structure by precisely reproducing the microstructures and textural characteristics of natural matters such as foam, cork, rubber, wood, and leather and enables to control thermal conductivity and an elastic modulus by controlling the textural structures, thereby realizing senses of touch such as human-friendly senses of tactile warmth and elasticity like natural matters, and a method of manufacturing the metal architectured plate.

It should be noted that effects of the present invention are not limited to the effects as described above, and the effects include all effects that can be inferred from the configuration of the present disclosure described in the following specification or claims.

BRIEF DESCRIPTION OF DRAWINGS

FIG. 13 is a table showing equivalent thermal conductivity according to the stacking thickness and the ratio of the width of the microchannel with senses of tactile warmth and elasticity and the width of the base microchannel in the metal architectured plate with senses of tactile warmth and elasticity according to an embodiment of the present disclosure.

DESCRIPTION OF EMBODIMENTS

Figure 1:
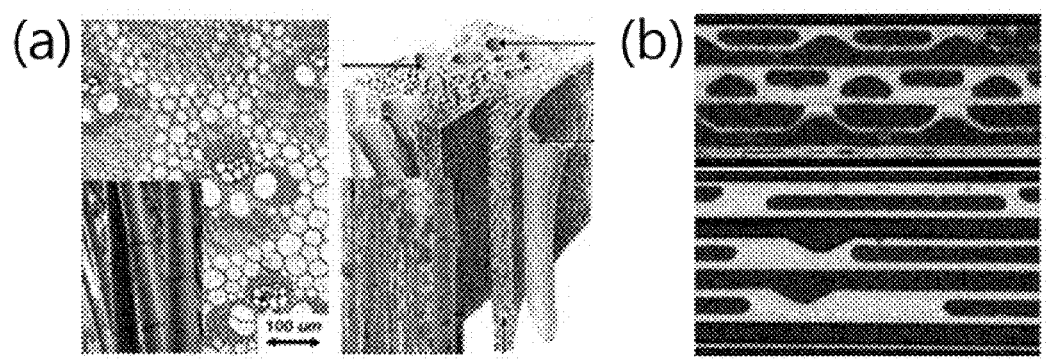
FIG. 1 is a view comparing (a) the microstructure and texture of a natural matter (wood) that are motives of the structural characteristic of a metal sheet of the present disclosure with (b) a picture of a cross-section of the metal sheet of the present disclosure to be described below.

A metal architectured plate with senses of tactile warmth and elasticity of the present disclosure is configured by stacking sheet-like metal architectured materials having micro-thickness with senses of tactile warmth and elasticity, which include base microchannels formed with regular intervals; and microchannels with senses of tactile warmth and elasticity formed to protrude between the base microchannels, such that the base microchannels and the microchannels with senses of tactile warmth and elasticity form channels with senses of tactile warmth and elasticity, which are spaces for allowing control of thermal conductivity and an elastic modulus.

EMBODIMENTS

Hereinafter, the present disclosure is described with reference to the accompanying drawings. However, the present disclosure may be modified in various different ways and is not limited to the embodiments described herein. Further, in the accompanying drawings, components irrelevant to the description will be omitted in order to clearly describe the present disclosure, and similar reference numerals will be used to describe similar components throughout the specification.

Throughout the specification, when an element is referred to as being "connected with (coupled to, combined with, in contact with)" another element, it may be "directly connected" to the other element and may also be "indirectly connected" to the other element with another element intervening therebetween. Further, unless explicitly described otherwise, "comprising" any components will be understood to imply the inclusion of other components rather than the exclusion of any other components.

Terms used in the present disclosure are used only in order to describe specific exemplary embodiments rather than limiting the present disclosure. Singular forms are intended to include plural forms unless the context clearly indicates otherwise. It will be further understood that the terms "comprising" or "having" used in this specification specify the presence of stated features, numerals, steps, operations, components, parts, or a combination thereof, but do not preclude the presence or addition of one or more other features, numerals, steps, operations, components, parts, or a combination thereof.

The term 'architectured' used herein to describe the present disclosure means stacking of metal materials with senses of tactile warmth and elasticity.

In general, 'architectured' is a term generally used in architecture and means that truss structures are stacked by forming frames or structures in triangular net shapes using straight members. In general, terms 'lamina', 'laminate', etc. are usually used in the technique of stacking thin metal sheets, but as a different structure is used in the sheet of the present disclosure, the architectural term 'architectured' is used herein.

As described above, metal materials of the prior art have the disadvantage that even though they are useful as the surface materials of various interior and exterior materials, they are heavy in comparison to natural matter materials, give a cold sense of touch to users, and cannot give human-friendly senses of tactile warmth and elasticity like natural matter materials, so improvement is needed.

Accordingly, the present disclosure has been derived to solve the problem that it is difficult to apply tactile warmth and elasticity that are human-friendly senses of touch to the metal materials having rigidity and ductility in the prior art, and an objective of the present disclosure is to provide a metal material that uses existing metal, but is light and warm and can give tactile warmth and elasticity that are human-friendly senses of touch.

Hereinafter, embodiments of the present disclosure are described in detail with reference to the accompanying drawings.

FIG. 1 is a view comparing (a) the microstructure and texture of a natural matter (wood) that are motives of the structural characteristic of a metal sheet of the present disclosure with (b) a picture of a cross-section of the metal sheet of the present disclosure to be described below.

Referring to FIG. 1, it can be seen that the present disclosure has been derived to solve the problem that it is difficult to apply tactile warmth and elasticity that are human-friendly senses of touch to the metal materials having rigidity and ductility in the prior art on the basis of the microstructure and textural characteristics of natural matters, particularly, wood, and it is possible to provide metal that uses existing metal, but is light in comparison to existing metal and can make people feel friendly senses of touch such as tactile warmth and elasticity by employing a new manufacturing technique.

That is, it can be seen that the present disclosure can provide a metal architectured plate with senses of tactile warmth and elasticity that uses existing metal but can attract various sensitivities of human through the soft sense of touch and the tactile warmth of leather and the visual sense of stability from the pattern of wood materials while keeping the advantages of metal by changing designs of patterns and shapes and adjusting spacings, thickness, etc. between shapes, and that is a new material more excellent than complex materials or new macromolecular materials that are rising as advanced materials at present.

A metal architectured plate with senses of tactile warmth and elasticity according to an embodiment of the present disclosure is described.

Figure 2:
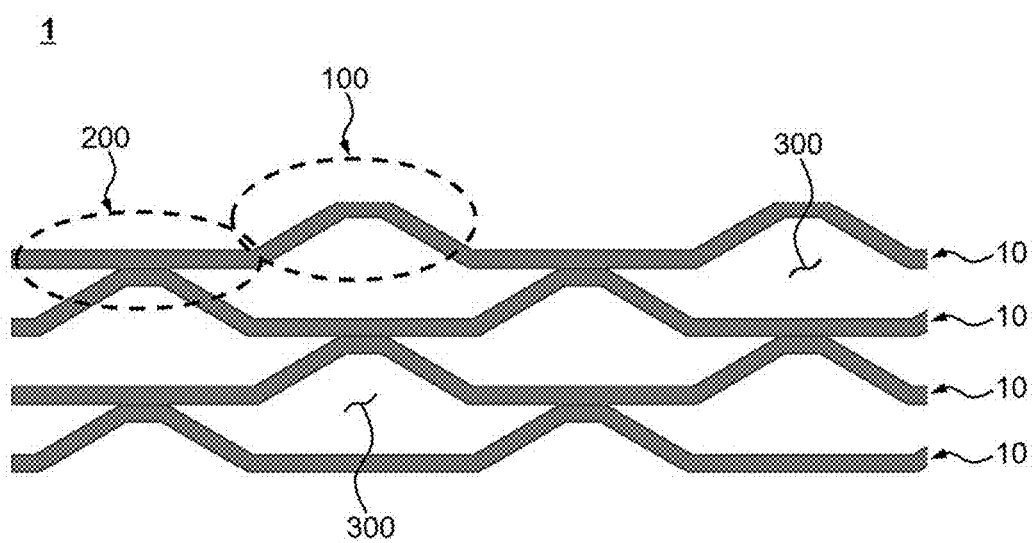
FIG. 2 is a view schematically showing the structure of a metal architectured plate 1 with senses of tactile warmth and elasticity according to an embodiment of the present disclosure.

FIG. 2 is a view schematically showing the structure of a metal architectured plate 1 with senses of tactile warmth and elasticity according to an embodiment of the present disclosure.

Figure 3:
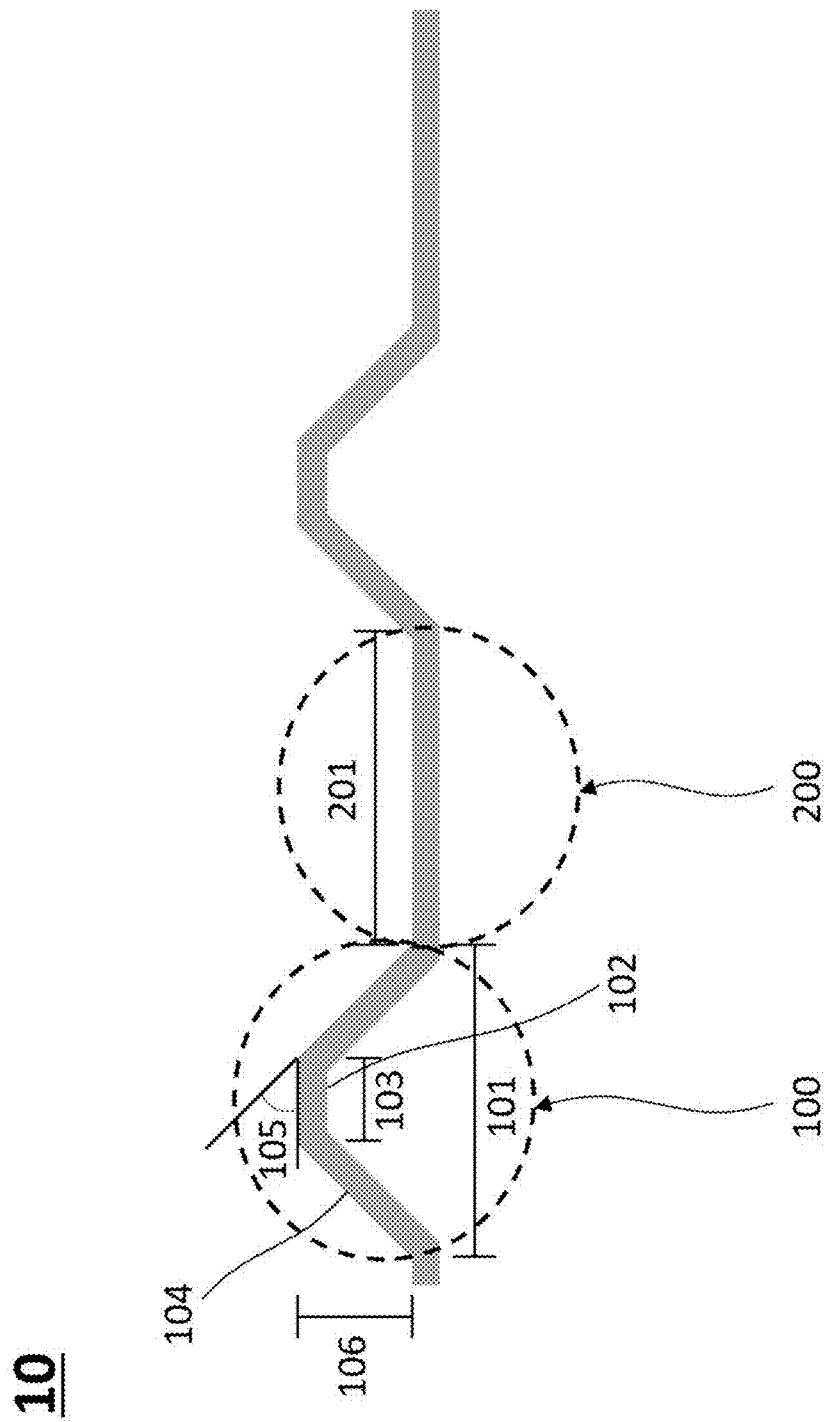
FIG. 3 is a view schematically showing the structure of a metal architectured material 10 with senses of tactile warmth and elasticity according to an embodiment of the present disclosure.

FIG. 3 is a view schematically showing the structure of a metal architectured material 10 with senses of tactile warmth and elasticity according to an embodiment of the present disclosure.

Referring to FIGS. 2 and 3, a metal architectured plate 1 with senses of tactile warmth and elasticity according to an embodiment of the present disclosure may be configured such that sheet-like metal architectured materials 10 having micro-thickness with senses of tactile warmth and elasticity are stacked to form channels 300 with senses of tactile warmth and elasticity that are spaces for allowing control of thermal conductivity and a sense of tactile elasticity.

The metal architectured material 10 with senses of tactile warmth and elasticity may include: a plurality of base microchannels 200 formed with regular intervals; and a plurality of microchannels 100 with senses of tactile warmth and elasticity that are formed to protrude between the base microchannels.

The metal architectured material 10 with senses of tactile warmth and elasticity may be manufactured by pressing a foil made of metal or an alloy such as aluminum, copper, steel, stainless steel, and Invar (Nib-Fe alloy) and having a thickness of 3 μm to 100 μm using a mold having the shapes of the base microchannels 200 and the microchannels 100 with senses of tactile warmth and elasticity.

The base microchannels 200 and the microchannels 100 with senses of tactile warmth and elasticity may be formed in the transverse or longitudinal direction of the metal architectured material 10 with senses of tactile warmth and elasticity.

The ratio of the width 101 of the microchannel 100 with senses of tactile warmth and elasticity and the width 201 of the base microchannel 200 may be 1:10 to 10:1. More preferably, the ratio of the width 101 of the microchannel 100 with senses of tactile warmth and elasticity and the width 201 of the base microchannel 200 may be 1:10 to 1:1.

The microchannel 100 with senses of tactile warmth and elasticity may include: a pair of slopes 104 protruding at a predetermined contact angle from ends of each side of the base microchannel 200; and a ridge 102 connecting ends of the pair of slopes 104 that are opposite to the ends connected to the base microchannel 200.

The width 101 of the microchannel 100 with senses of tactile warmth and elasticity may be 5 μm to 5000 μm.

The width 201 of the base microchannel 200 may be 5 μm to 5000 μm in accordance with the ratio of the width 101 of the microchannel 100 with senses of tactile warmth and elasticity and the width 201 of the base microchannel 200.

The width 103 of the ridge 102 may be 1 μm to 4000 μm.

The contact angle 105, which is an angle made by the slope 104 and the ridge 102 or the base microchannel 200, may be 0° to 90°.

The metal architectured plate 1 with senses of tactile warmth and elasticity, as shown in FIG. 2, may be characterized in that one metal architectured material 10 with senses of tactile warmth and elasticity is stacked such that the ridge 102 of the microchannel 100 with senses of tactile warmth and elasticity is in contact with the bottom of the base microchannel 200 of another metal architectured material 10 with senses of tactile warmth and elasticity to form the channel 300 with senses of tactile warmth and elasticity.

The thermal conductivity of the metal architectured plate 1 with senses of tactile warmth and elasticity formed by stacking the metal architectured materials 10 with senses of tactile warmth and elasticity having the above configuration may be 0.05 W/m·K to 10 W/m·K. When the thermal conductivity of the metal architectured plate 1 with senses of tactile warmth and elasticity is y and the ratio of the width 101 of the microchannel 100 with senses of tactile warmth and elasticity and the width 201 of the base microchannel 200 is x, the thermal conductivity of the metal architectured plate 1 with senses of tactile warmth and elasticity may be designed using $y=A(1)e^{-A(2)}+A(3)$ and Table 1 showing coefficients of an equation for deriving the thermal conductivity.

TABLE 1

| Thickness | Additional stacking | A(1) | A(2) | A(3) |
|---|---|---|---|---|
| 50 | 0 | 3.046 | 1.104 | 0.251 |
|  | 1 | 2.859 | 1.068 | 0.194 |
|  | 2 | 2.951 | 1.058 | 0.217 |
| 40 | 0 | 2.356 | 1.074 | 0.165 |
|  | 1 | 2.182 | 1.082 | 0.142 |
|  | 2 | 2.214 | 1.001 | 0.139 |
| 30 | 0 | 1.675 | 1.073 | 0.111 |
|  | 1 | 1.605 | 1.119 | 0.097 |
|  | 2 | 1.689 | 1.084 | 0.112 |

The thermal conductivity of the metal architectured plate 1 with senses of tactile warmth and elasticity manufactured as described above corresponds to a value similar to the thermal conductivity value of natural matter materials such as some kinds of rubber or leather, or wood. Accordingly, it is confirmed that the metal sheet of the present disclosure can provide human-friendly senses of tactile warmth similar to natural matters while using metal materials.

A metal architectured plate 1 with senses of tactile warmth and elasticity according to another embodiment of the present disclosure is described.

Figure 4:
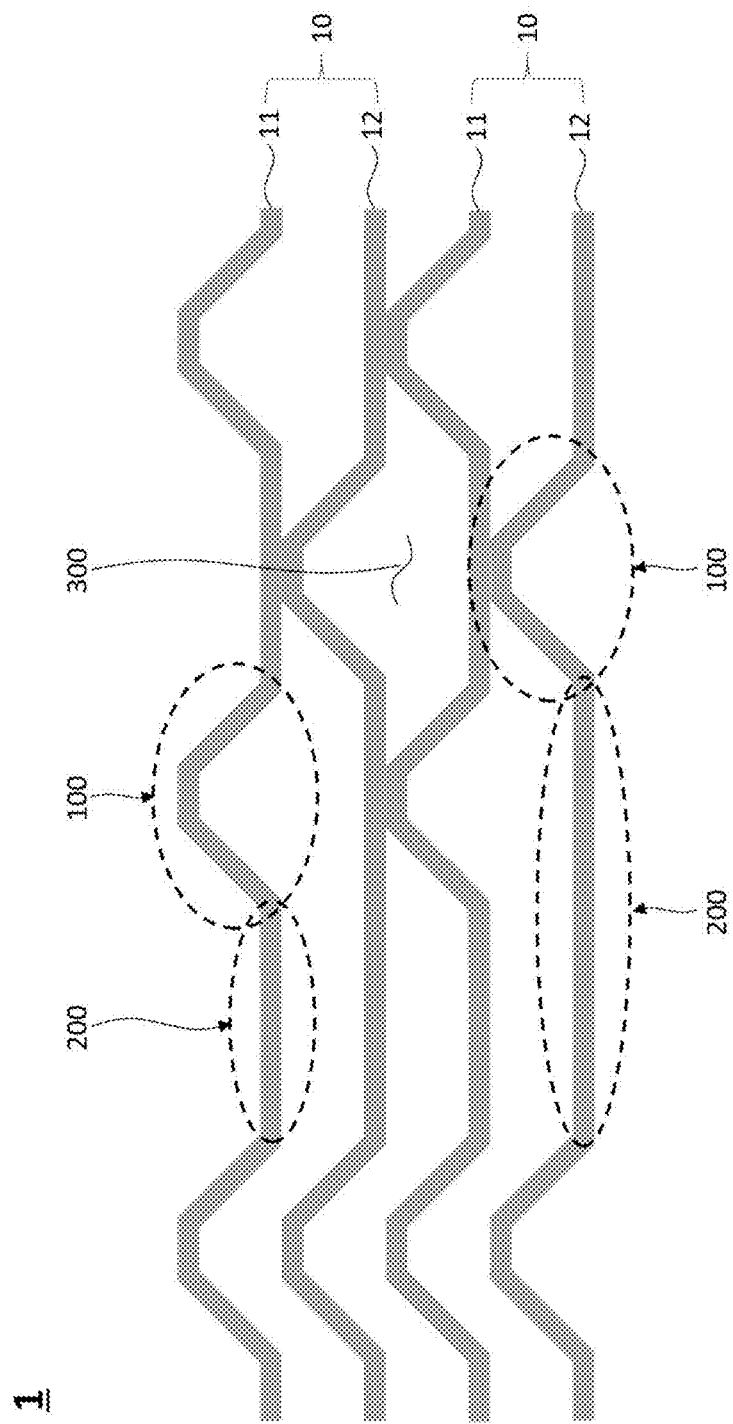
FIG. 4 is a view schematically showing a metal architectured plate 1 with senses of tactile warmth and elasticity according to another embodiment of the present disclosure.

FIG. 4 is a view schematically showing a metal architectured plate 1 with senses of tactile warmth and elasticity according to another embodiment of the present disclosure.

Referring to FIG. 4, a metal architectured plate 1 with senses of tactile warmth and elasticity according to an embodiment of the present disclosure may be configured such that sheet-like metal architectured materials 10 having micro-thickness with senses of tactile warmth and elasticity are stacked to form channels 300 with senses of tactile warmth and elasticity that are spaces for allowing control of thermal conductivity and a sense of tactile elasticity.

The metal architectured plate with senses of tactile warmth and elasticity may include: a plurality of base microchannels 200 formed with regular intervals; and a plurality of microchannels 100 with senses of tactile warmth and elasticity that are formed to protrude between the base microchannels.

The metal architectured plate 1 with senses of tactile warmth and elasticity may be characterized in that the metal architectured materials 10 with senses of tactile warmth and elasticity are configured by alternately staking a first metal architectured material 11 with senses of tactile warmth and elasticity in which the ratio of the width of the microchannel 100 with senses of tactile warmth and elasticity and the width of the base microchannel 200 is 1:2n−1 (n is an integer of 1 or more), and a second metal architectured material 12 with senses of tactile warmth and elasticity in which the ratio of the width of the microchannel with senses of tactile warmth and elasticity and the width of the base microchannel is 1:2n (n is an integer of 1 or more).

Figure 5:
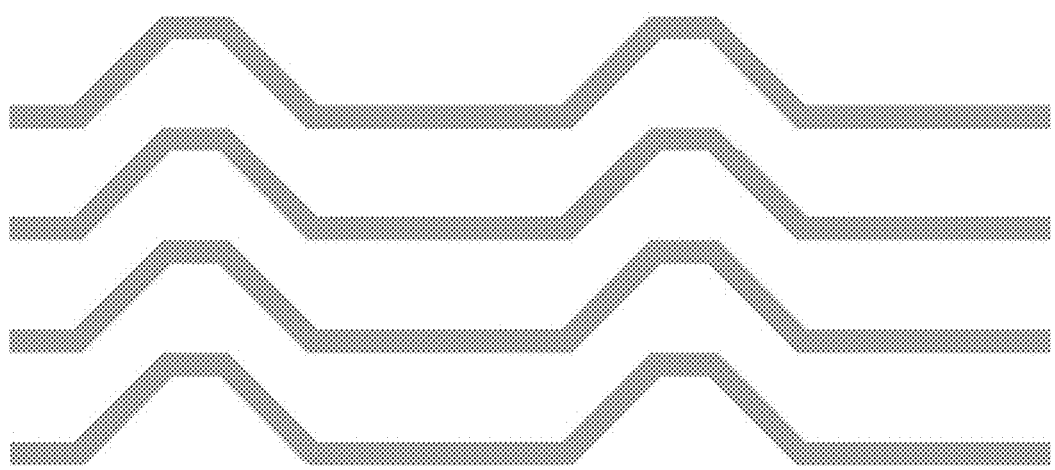
FIG. 5 is a view schematically showing the structure of a metal sheet in which microchannels with senses of tactile warmth and elasticity are stacked in parallel to each other.

FIG. 5 is a view schematically showing the structure of a metal sheet in which micro-channels with senses of tactile warmth and elasticity are stacked in parallel to each other.

Referring to FIG. 5, when microchannels with senses of tactile warmth and elasticity are stacked in parallel without being separated from each other as shown in FIG. 5, the microchannels with senses of tactile warmth and elasticity overlap each other, so channels with senses of tactile warmth and elasticity that are spaces imparting tactile warmth and elasticity of the present disclosure are not formed, whereby the effect of human-friendly senses of touch such as tactile warmth and elasticity cannot be achieved.

Accordingly, the metal architectured materials 10 with senses of tactile warmth and elasticity in which the ratios of the microchannel 100 with senses of tactile warmth and elasticity and the width of the base microchannel are 1:2n−1 and 1:2n, respectively, are alternately stacked such that the microchannels 100 with senses of tactile warmth and elasticity are not parallel to each other and spaced apart from each other, whereby it is possible to form a shape having a pore structure like the microstructures of natural matters without overlapping when they are stacked.

The metal architectured material 10 with senses of tactile warmth and elasticity may be manufactured by applying electroforming on a foil made of metal or an alloy such as aluminum, copper, steel, stainless steel, and invar (Nib-Fe alloy) and having a thickness of 10 μm to 100 μm using a mold having the shapes of the base microchannels and the microchannels with senses of tactile warmth and elasticity.

The base microchannels 200 and the microchannels 100 with senses of tactile warmth and elasticity are formed in the transverse or longitudinal direction of the metal architectured material 10 with senses of tactile warmth and elasticity.

The metal architectured material 10 with senses of tactile warmth and elasticity is the same as the metal architectured material 10 with senses of tactile warmth and elasticity of the embodiment described above, so it is described with reference to FIG. 3.

Referring to FIG. 3, the width 101 of the microchannels 100 with senses of tactile warmth and elasticity may be 1 μm to 1,000 μm.

The width 201 of the base microchannels 200 may have a size such that the ratio to the width 101 of the microchannel 100 with senses of tactile warmth and elasticity is 1:2n−1 or 1:2n (n is an integer of 1 or more), as described above.

The width 103 of the ridge 102 may have a value smaller than or equal to the width 101 of the microchannel 100 with senses of tactile warmth and elasticity, in more detail, may be 1 μm to 1,000 μm.

The contact angle 105, which is an angle made by the slope 104 and the ridge 102 or the base microchannel 200, may be 0° to 90°, more preferably, 5° to 85°.

The metal architectured materials 10 with senses of tactile warmth and elasticity may be stacked into a sheet using a stacking of soldering to improve porosity and flexibility of the stacked structure.

The thermal conductivity of the metal architectured plate 1 with senses of tactile warmth and elasticity which has the configuration described above may be 0.05 W/m·K to 5 W/m·K.

The thermal conductivity value may be similar to the thermal conductivity value of natural matter materials such as some kinds of rubber or leather, or wood. Accordingly, it can be confirmed that the metal sheet of the present disclosure can provide human-friendly senses of tactile warmth similar to natural matters while using a metal material.

The elastic modulus of the metal architectured plate 1 with senses of tactile warmth and elasticity which has the configuration described above may be 0.1 MPa or 10 GPa.

The elastic modulus value is about 1/50 of that of solid metals. Accordingly, it can be confirmed that the metal sheet of the present disclosure can provide human-friendly senses of tactile elasticity similar to natural matters while using a metal material.

According to an embodiment of the present disclosure, there is an effect that it is possible to provide a metal sheet that can realize senses of touch such as human-friendly senses of tactile warmth and elasticity like natural matters because it is possible to precisely reproduce the microstructures and textural characteristics of natural matters by virtue of configurational characteristics as described above, enabling to have a regular internal pore structure and to control thermal conductivity and elastic modulus by controlling the textural structure as described above.

A metal architectured plate with senses of tactile warmth and elasticity according to another embodiment of the present disclosure is described.

Figure 6:
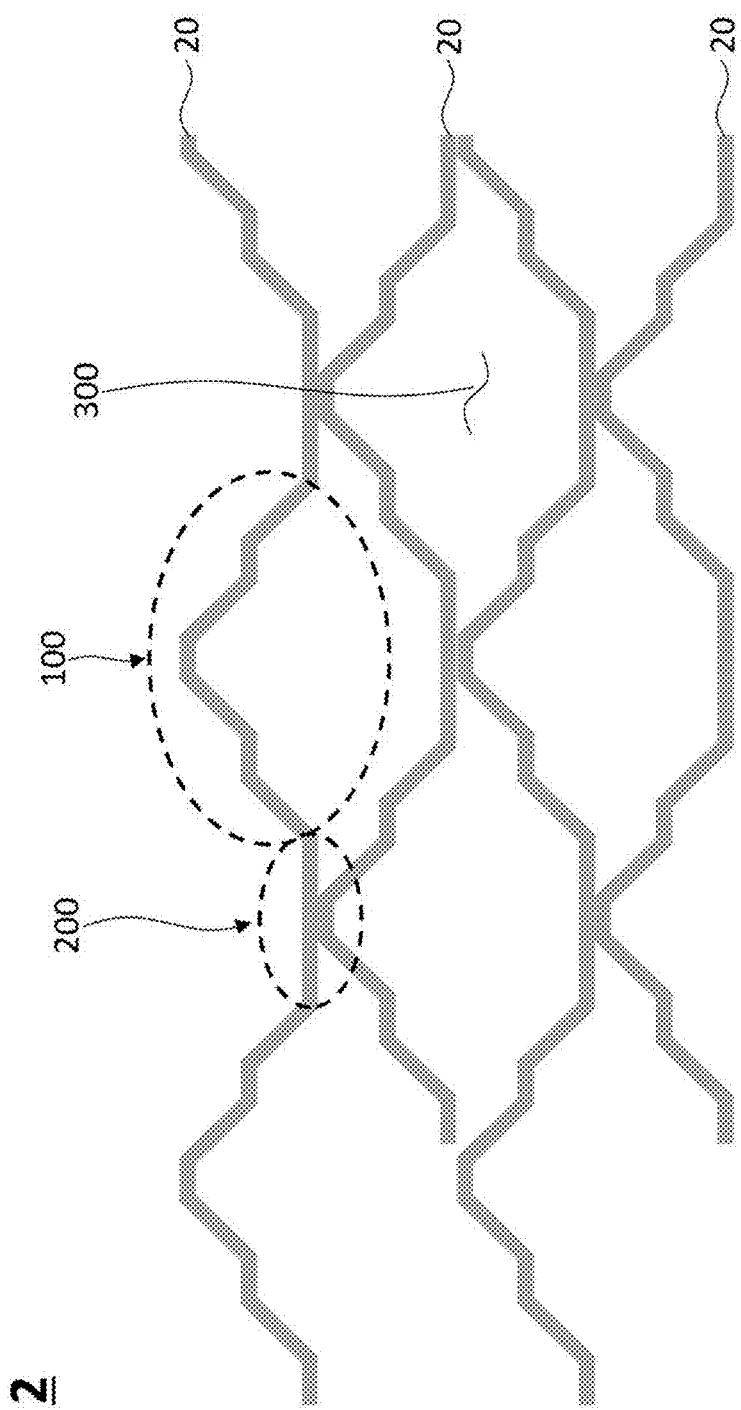
FIG. 6 is a view schematically showing the structure of a metal architectured plate 2 with senses of tactile warmth and elasticity according to another embodiment of the present disclosure.

FIG. 6 is a view schematically showing the structure of a metal architectured plate 2 with senses of tactile warmth and elasticity according to another embodiment of the present disclosure.

Figure 7:
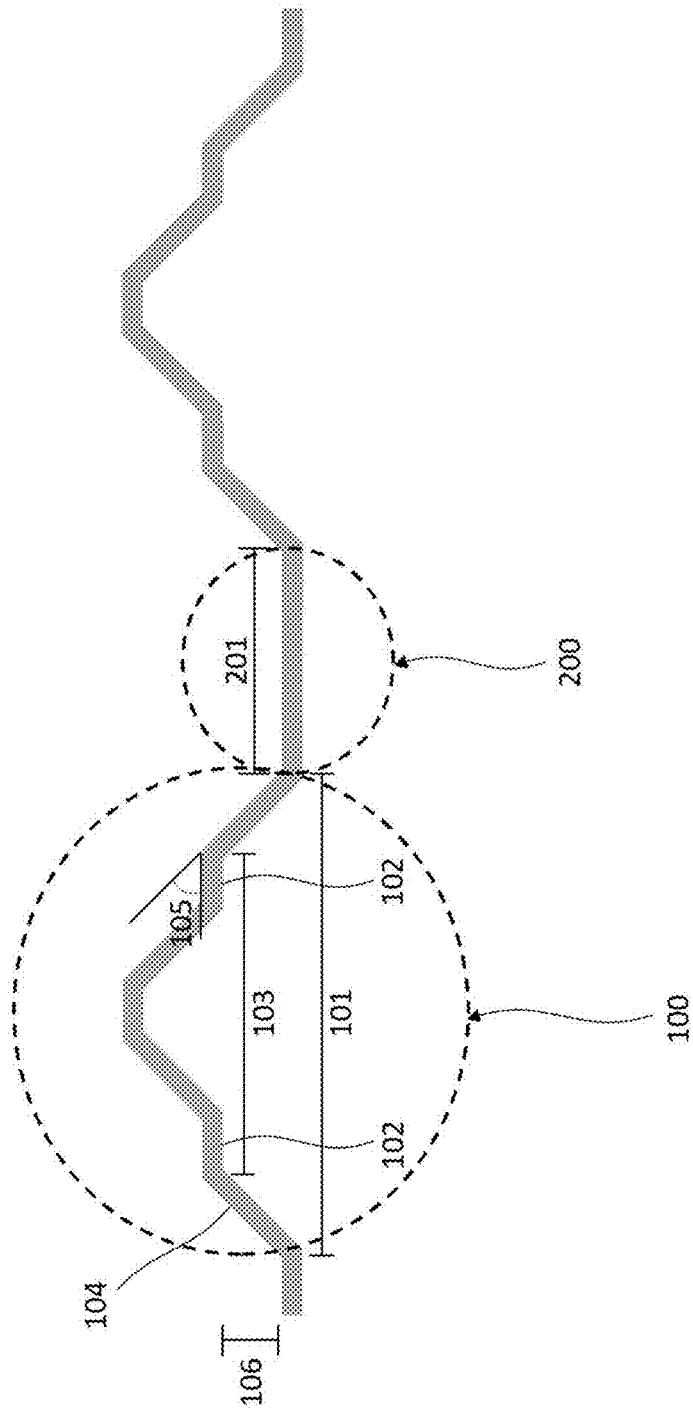
FIG. 7 is a view schematically showing the structure of a metal architectured material 20 with senses of tactile warmth and elasticity of the present disclosure.
Figure 8:
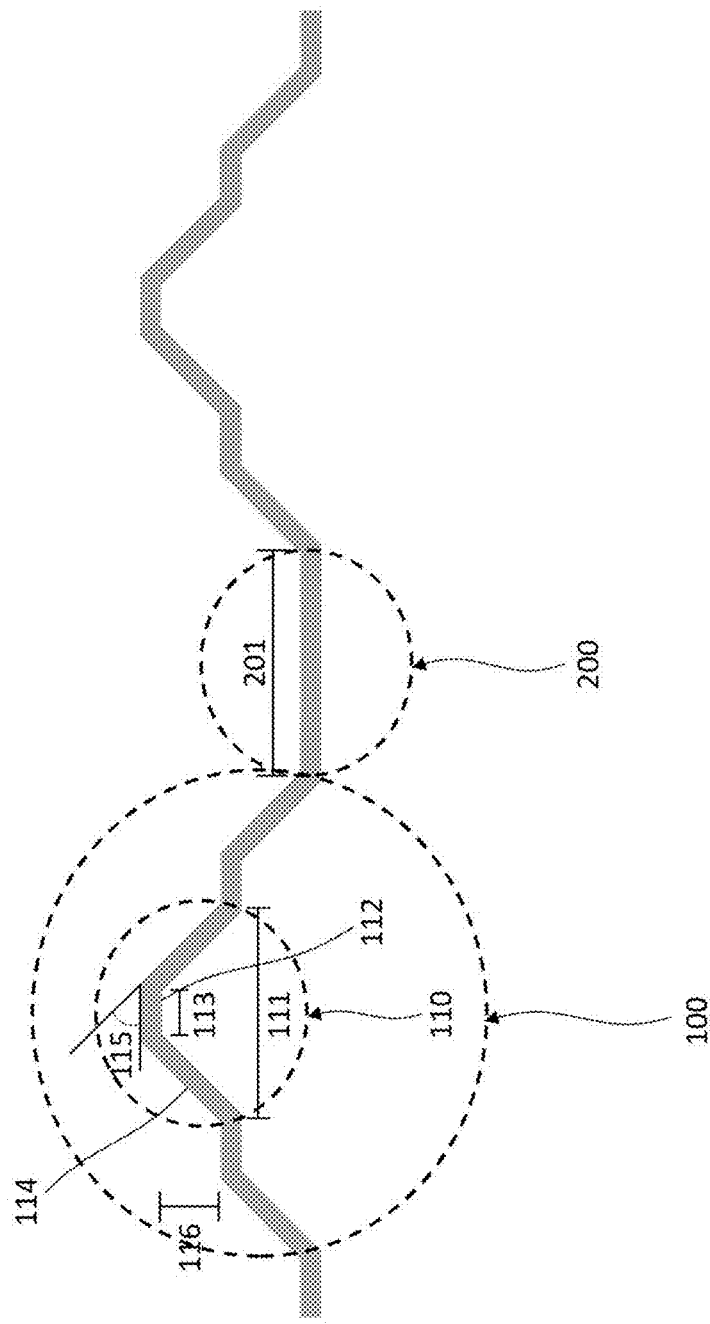
FIG. 8 is a view schematically showing the structure of the metal architectured material 20 with senses of tactile warmth and elasticity of the present disclosure.

FIGS. 7 and 8 are views schematically showing the structure of a metal architectured material 20 with senses of tactile warmth and elasticity of the present disclosure.

Referring to FIGS. 6 to 8, a metal architectured plate 2 with senses of tactile warmth and elasticity according to an embodiment of the present disclosure may be configured such that sheet-like metal architectured materials 20 having micro-thickness with senses of tactile warmth and elasticity are stacked to form channels 300 with senses of tactile warmth and elasticity that are spaces for allowing control of thermal conductivity and a sense of tactile elasticity.

The metal architectured material 20 with senses of tactile warmth and elasticity may include: a plurality of base microchannels 200 formed with regular intervals; and a plurality of first microchannels 100 with senses of tactile warmth and elasticity that are formed to protrude between the base microchannels.

The first microchannel 100 with senses of tactile warmth and elasticity is formed in a stepped shape including a second microchannel 110 with senses of tactile warmth and elasticity protruding from the first microchannel 100 with senses of tactile warmth and elasticity and having a width smaller than the first microchannel with senses of tactile warmth and elasticity.

In this configuration, the metal architectured materials 20 with senses of tactile warmth and elasticity may be stacked such that the first microchannels 100 with senses of tactile warmth and elasticity are spaced apart so as not to overlap each other.

As described above, when the first microchannels 100 with senses of tactile warmth and elasticity are stacked in parallel without being separated from each other, they overlap each other, so the channels 300 with senses of tactile warmth and elasticity that are spaces imparting tactile warmth and elasticity are not formed, whereby it is impossible to provide the effect of human-friendly senses of touch such as tactile warmth and elasticity.

Accordingly, the first microchannels 100 with senses of tactile warmth and elasticity are stacked not in parallel but spaced apart from each other, as in the present disclosure, whereby it is possible to form a shape having a pore structure like the microstructures of natural matters without overlapping when they are stacked.

Further, as described above, since a stepped shape is formed such that the second microchannel 110 with senses of tactile warmth and elasticity having a width 111 smaller than the width 101 of the first micro channel 100 with senses of tactile warmth and elasticity to protrude from the first microchannel 100 with senses of tactile warmth and elasticity, there are portions not fixed when stacked, so it is possible to control tactile elasticity including increasing an elastic deformation amount.

The metal architectured materials 20 with senses of tactile warmth and elasticity are formed such that a plurality of microchannels with senses of tactile warmth and elasticity (not shown) repeatedly protrude in the same way that the second microchannel 110 with senses of tactile warmth and elasticity protrudes from the first microchannel 100 with senses of tactile warmth and elasticity, whereby it is possible to adjust an elastic deformation amount to have desired tactile elasticity.

The metal architectured material 20 with senses of tactile warmth and elasticity may be manufactured by applying electroforming on a foil made of metal or an alloy such as aluminum, copper, steel, stainless steel, and invar (Nib-Fe alloy) and having a thickness of 10 μm to 100 μm using a mold having the shapes of the base microchannels and the microchannels with senses of tactile warmth and elasticity.

The base microchannels 200 and the microchannels 100 with senses of tactile warmth and elasticity are formed in the transverse or longitudinal direction of the metal architectured material 20 with senses of tactile warmth and elasticity.

Referring to FIGS. 7 and 8, the first microchannel 100 with senses of tactile warmth and elasticity of the metal architectured material 20 with senses of tactile warmth and elasticity may include: a pair of first slopes 104 protruding at a predetermined contact angle 105 from ends of each side of the base microchannel 200; and a first ridge 102 connecting ends of the pair of slopes 104 that are opposite to the ends connected to the base microchannel 200.

Further, the second microchannel 110 with senses of tactile warmth and elasticity may include: a pair of second slopes 114 protruding at a predetermined contact angle 115 from the first ridge 102; and a second ridge 112 connecting ends of the pair of second slopes 104 that are opposite to the ends connected to the first ridge 112.

The metal architectured material 20 with senses of tactile warmth and elasticity may have a plurality of microchannels with senses of tactile warmth and elasticity including a third microchannel with senses of tactile warmth and elasticity and a fourth microchannel with senses of tactile warmth and elasticity sequentially protrude in the same way that the second microchannel with senses of tactile warmth and elasticity protrudes from the first microchannel with senses of tactile warmth and elasticity to be formed in a stepped shape.

The metal architectured materials 20 with senses of tactile warmth and elasticity formed in stepped shapes are stacked such that the second ridge 112 of one metal architectured material 20 with senses of tactile warmth and elasticity is in contact with the bottom of the base microchannels 200 of another metal architectured material 20 with senses of tactile warmth and elasticity, whereby the microchannels 100 with senses of tactile warmth and elasticity are stacked not in parallel but spaced apart from each other to form the channel 300 with senses of tactile warmth and elasticity. Accordingly, it is possible to form a pore structure like the microstructures of natural matters without overlapping when stacking, and it is possible to control tactile elasticity by adjusting an elastic deformation amount.

The width 103 of the first ridge 102 and the width 113 of the second ridge 112 may be independently 1,000 μm or less.

The first contact angle 105 may be the angle made by the first slope 104 and the first ridge 102 or the base microchannel 200.

The second contact angle 115 may be the angle made by the second slope 114 and the second ridge 112 or the first ridge 102.

The first contact angle 105 and the second contact angle 115 may be independently 0° to 90°.

The metal architectured materials 20 with senses of tactile warmth and elasticity may be stacked into a sheet using a stacking of soldering to improve porosity and flexibility of the stacked structure.

The thickness of the metal architectured material with senses of tactile warmth and elasticity may be 10 μm to 100 μm.

The thermal conductivity of the metal architectured plate 2 with senses of tactile warmth and elasticity which has the configuration described above may be 0.05 W/m·K to 5 W/m·K.

The thermal conductivity value corresponds to a value similar to the thermal conductivity value of natural matter materials such as some kinds of rubber or leather, or wood. Accordingly, it can be confirmed that the present disclosure can provide human-friendly senses of tactile warmth similar to natural matters while using a metal material.

The elastic modulus of the metal architectured plate 2 with senses of tactile warmth and elasticity which has the configuration described above may be 0.1 Mpa or 10 Gpa.

The elastic modulus value corresponds to a relatively small value in comparison to solid metals and corresponds to a value similar to the elastic modulus values of natural matter materials such as wood or leather. Accordingly, it can be confirmed that the present disclosure can provide human-friendly senses of tactile elasticity similar to natural matters while using a metal material.

Figure 9:
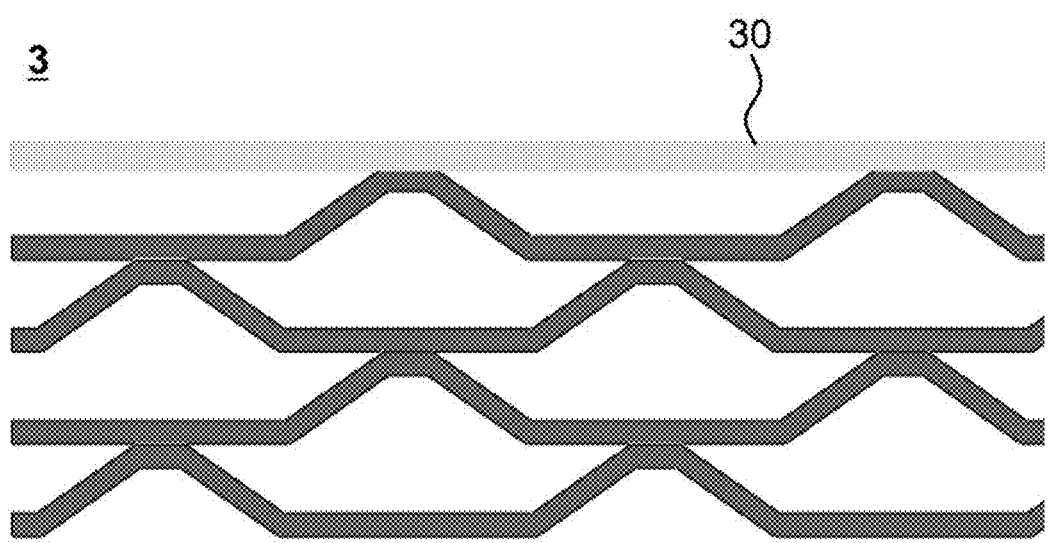
FIG. 9 is a view schematically showing a metal architectured plate 3 with senses of tactile warmth and elasticity according to another embodiment of the present disclosure.

FIG. 9 is a view schematically showing a metal architectured plate 3 with senses of tactile warmth and elasticity according to another embodiment of the present disclosure.

Referring to FIG. 9, the metal architectured plate 3 with senses of tactile warmth and elasticity according to another embodiment of the present disclosure may be formed by further stacking a sheet-like metal sheet material 30 not having a microchannel with senses of tactile warmth and elasticity and a base microchannel on the metal architectured plate with senses of tactile warmth and elasticity according to an embodiment of the present disclosure for use of the metal architectured plate with senses of tactile warmth and elasticity.

Figure 10:
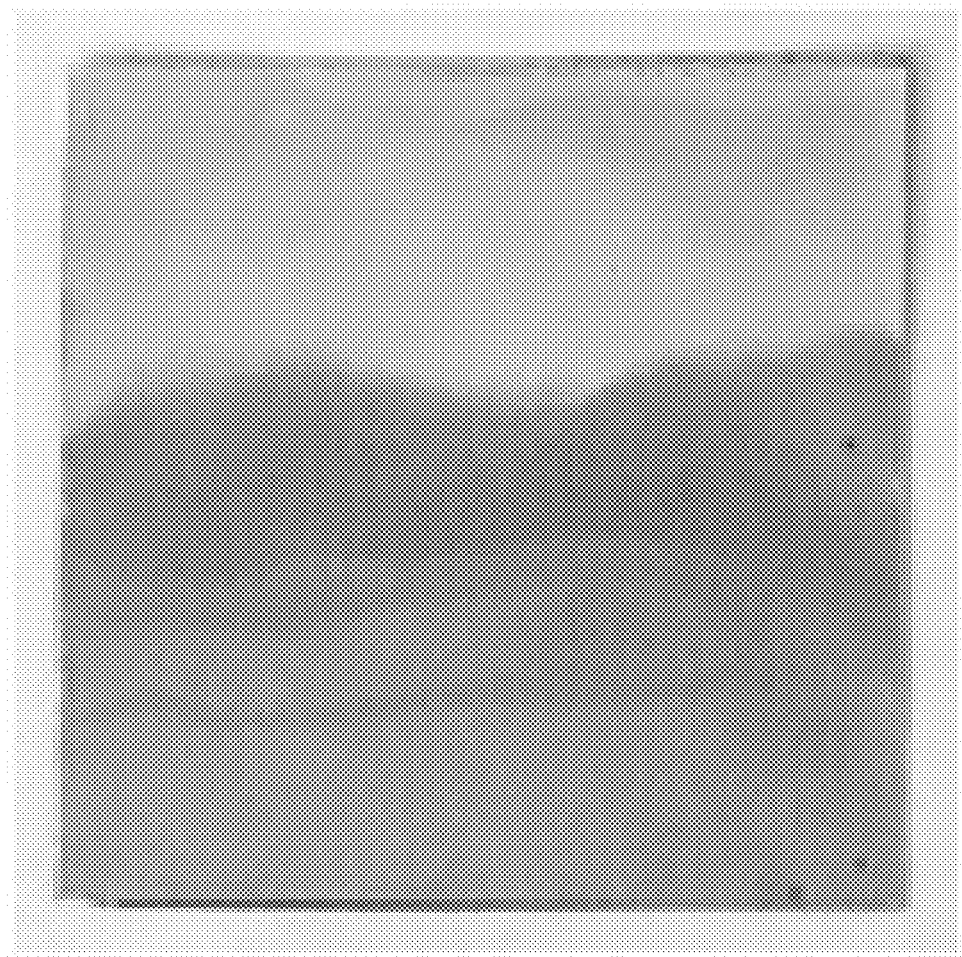
FIG. 10 is a picture of the metal architectured plate with senses of tactile warmth and elasticity according to an embodiment of the present disclosure.

FIG. 10 is a picture of the metal architectured plate with senses of tactile warmth and elasticity according to an embodiment of the present disclosure.

According to an embodiment of the present disclosure, there is an effect that it is possible to provide a metal sheet that can realize senses of touch such as human-friendly senses of tactile warmth and elasticity like natural matters because it is possible to precisely reproduce the microstructures and textural characteristics of natural matters by virtue of configurational characteristics as described above, enabling to have a regular internal pore structure and to control thermal conductivity and elastic modulus by controlling the textural structure as described above.

A method of manufacturing a metal architectured plate with senses of tactile warmth and elasticity according to another embodiment of the present disclosure is described.

Figure 11:
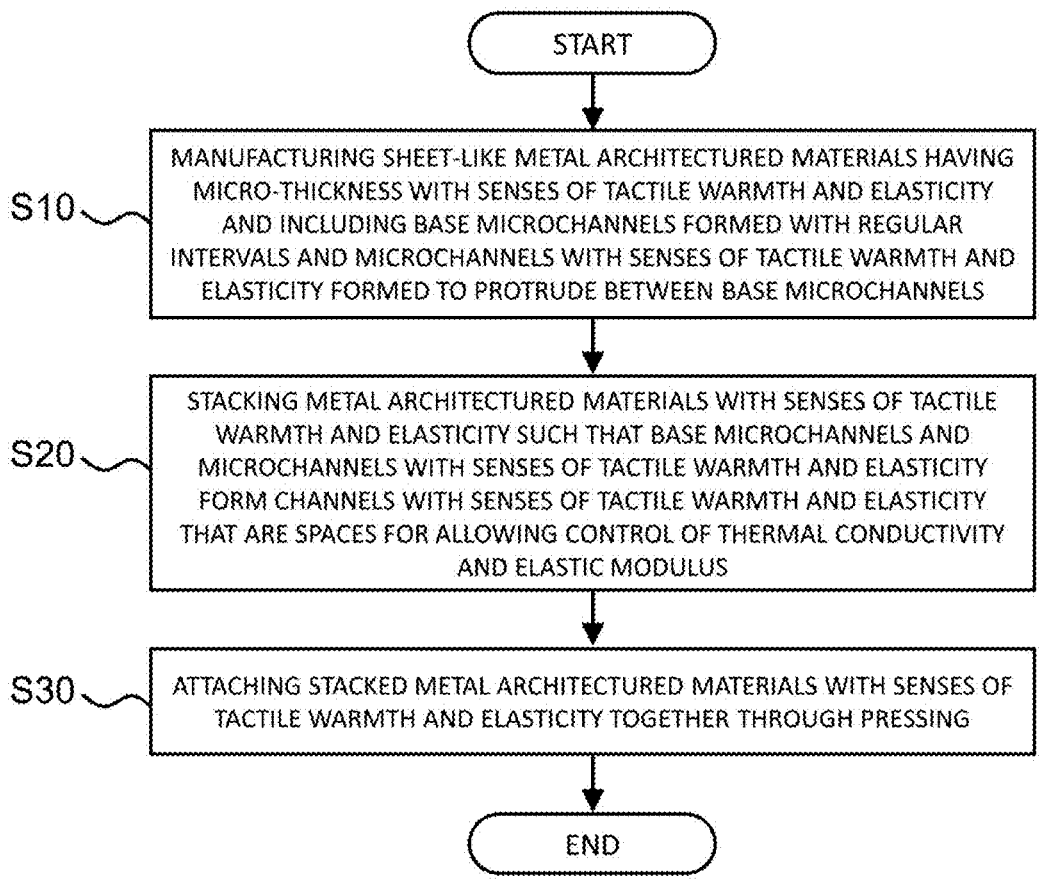
FIG. 11 is a view schematically showing a method of manufacturing a metal architectured plate with senses of tactile warmth and elasticity according to another embodiment of the present disclosure.

FIG. 11 is a view schematically showing a method of manufacturing a metal architectured plate with senses of tactile warmth and elasticity according to another embodiment of the present disclosure.

The method of manufacturing a metal architectured plate with senses of tactile warmth and elasticity of the present disclosure may include: a step S10 of manufacturing sheet-like metal architectured materials having micro-thickness with senses of tactile warmth and elasticity and which include base microchannels formed with regular intervals and microchannels with senses of tactile warmth and elasticity formed to protrude between the base microchannels; a step S20 of stacking the metal architectured materials with senses of tactile warmth and elasticity such that the base microchannels and the microchannels with senses of tactile warmth and elasticity form channels with senses of tactile warmth and elasticity that are spaces for allowing control of thermal conductivity; and a step S30 of attaching the stacked metal architectured materials with senses of tactile warmth and elasticity together through pressing.

In the step S10 of manufacturing metal architectured materials with senses of tactile warmth and elasticity, when the thermal conductivity of the metal architectured plate with senses of tactile warmth and elasticity is y and the ratio of the width of the microchannel with senses of tactile warmth and elasticity and the width of the base microchannel is x, the thermal conductivity of the metal architectured plate 1 with senses of tactile warmth and elasticity is derived by $y=A(1)e^{-A(2)x}+A(3)$, in accordance with the thickness of the metal architectured material with senses of tactile warmth and elasticity, and the coefficients are obtained from the above Table 1.

The step S10 of manufacturing metal architectured materials with senses of tactile warmth and elasticity may be a step of manufacturing the metal architectured material with senses of tactile warmth and elasticity such that the thermal conductivity of a manufactured metal architectured plate with senses of tactile warmth and elasticity becomes 0.05 W/m·K to 10 W/m·K by controlling the ratio of the width of the microchannel with senses of tactile warmth and elasticity and the width of the base microchannel. For example, from Table 1, the coefficients of the equation for deriving the thermal conductivity of the metal architectured plate with senses of tactile warmth and elasticity when the thickness of the metal architectured material with senses of tactile warmth and elasticity is 30 μm and there is no additional stacking are $A(1)=1.675$, $A(1)=1.073$, and $A(3)=0.111$, respectively, and in this case, the thermal conductivity of the metal architectured plate with senses of tactile warmth and elasticity may be set by $y=1.675e^{-1.073x}+0.111$.

The microchannel with senses of tactile warmth and elasticity in the step S10 of manufacturing metal architectured materials with senses of tactile warmth and elasticity is manufactured to include: a pair of slopes protruding at a predetermined contact angle from ends of each side of the base microchannel; and a ridge connecting ends of the pair of slopes that are opposite to the ends connected to the base microchannel.

The step S20 of stacking the metal architectured materials with senses of tactile warmth and elasticity is a step of stacking the metal architectured materials with senses of tactile warmth and elasticity such that the ridge of the microchannel with senses of tactile warmth and elasticity of one metal architectured material with senses of tactile warmth and elasticity is in contact with the bottom of the base microchannel of another metal architectured material with senses of tactile warmth and elasticity. In this case, it is preferable that the ridges are positioned at the center of bottom of the base microchannels.

Figure 12:
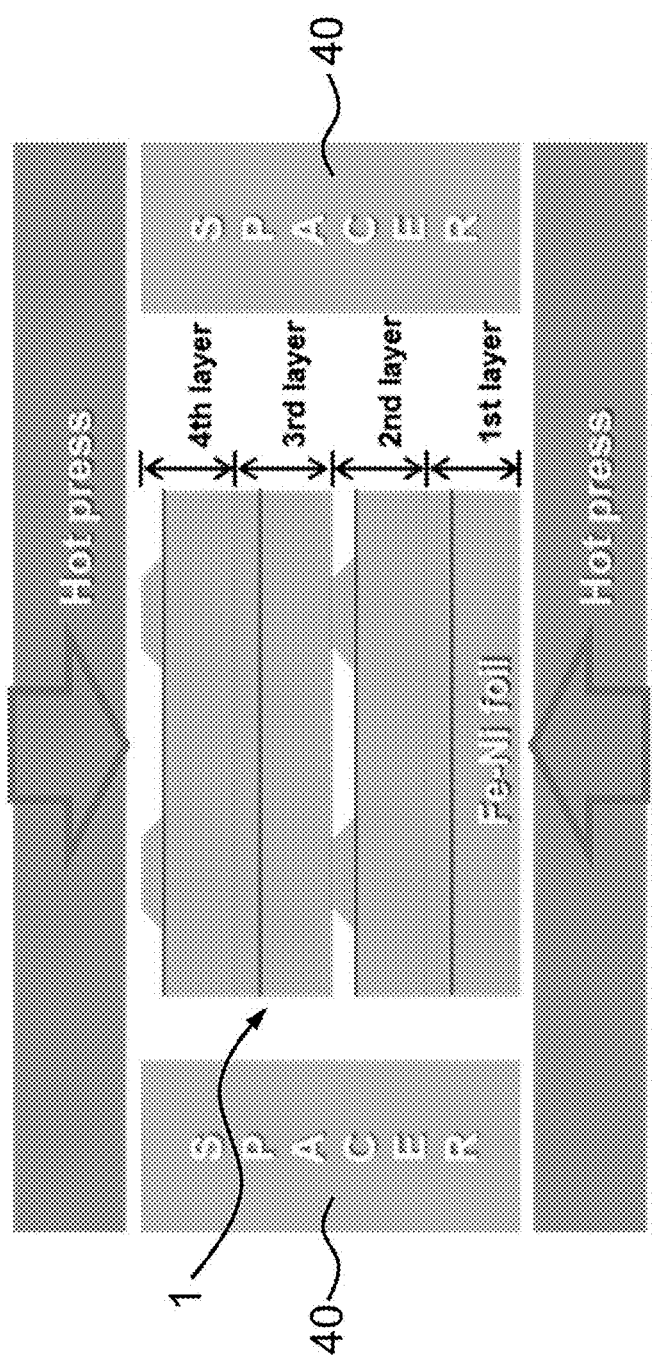
FIG. 12 is view schematically showing a pressing process in step S30 of pressing a stacked member of metal architectured materials with senses of tactile warmth and elasticity of the present disclosure.

FIG. 12 is view schematically showing a pressing process in the step S30 of attaching the stacked metal architectured materials with senses of tactile warmth and elasticity of the present disclosure through pressing.

The step S30 of attaching the stacked metal architectured materials with senses of tactile warmth and elasticity through pressing is performed by means of a spacer 40 having a target thickness of the metal architectured plate 1 with senses of tactile warmth and elasticity.

The metal architectured plate 1 with senses of tactile warmth and elasticity is manufactured by, as described above, stacking the metal architectured materials 10 with senses of tactile warmth and elasticity to correspond to the thickness of the metal architectured plate 1 with senses of tactile warmth and elasticity to be manufactured, disposing a pair of spacers 40 having a height corresponding to the target thickness of the metal architectured plate 1 with senses of tactile warmth and elasticity to be manufactured, and then performing hot pressing. The stacked metal architectured materials 10 with senses of tactile warmth and elasticity do not receive excessive pressure by the spacers 40, so microchannels with senses of tactile warmth and elasticity can be formed in uniform shapes.

According to an embodiment of the present disclosure, since channels with senses of tactile warmth and elasticity are formed in uniform shapes by virtue of the configurational features described above, there is an effect that it is possible to provide a method of manufacturing a metal architectured plate with senses of tactile warmth and elasticity which enables mass production by manufacturing the metal architectured plate with senses of tactile warmth and elasticity to have constant physical properties and allow for control of the thermal conductivity and a sense of elasticity of the sheet as necessary.

<Experimental Example 1> Control of a Sense of Tactile Warmth of Metal Architectured Plate with Senses of Tactile Warmth and Elasticity FIG. 13 is a table showing equivalent thermal conductivity according to the stacking thickness and the ratio of the width of the microchannel with senses of tactile warmth and elasticity and the width of the base microchannel in the metal architectured plate with senses of tactile warmth and elasticity according to an embodiment of the present disclosure.

As in FIG. 13, metal architectured plates with senses of tactile warmth and elasticity which have thicknesses of 50 μm, 40 μm, and 30 μm, respectively, and in which the ratios of the width of the microchannels with senses of tactile warmth and elasticity and the width of the base microchannels are 1:1, 1:2, and 1:4, respectively, were manufactured and then thermal conductivity was measured. It was found out, as the result of measurement, that the thermal conductivity had a maximum value of 1.261 W/m·K and a minimum value of 0.111 W/m·K, so it possible to provide an effect of tactile warmth using metal.

Figure 14:
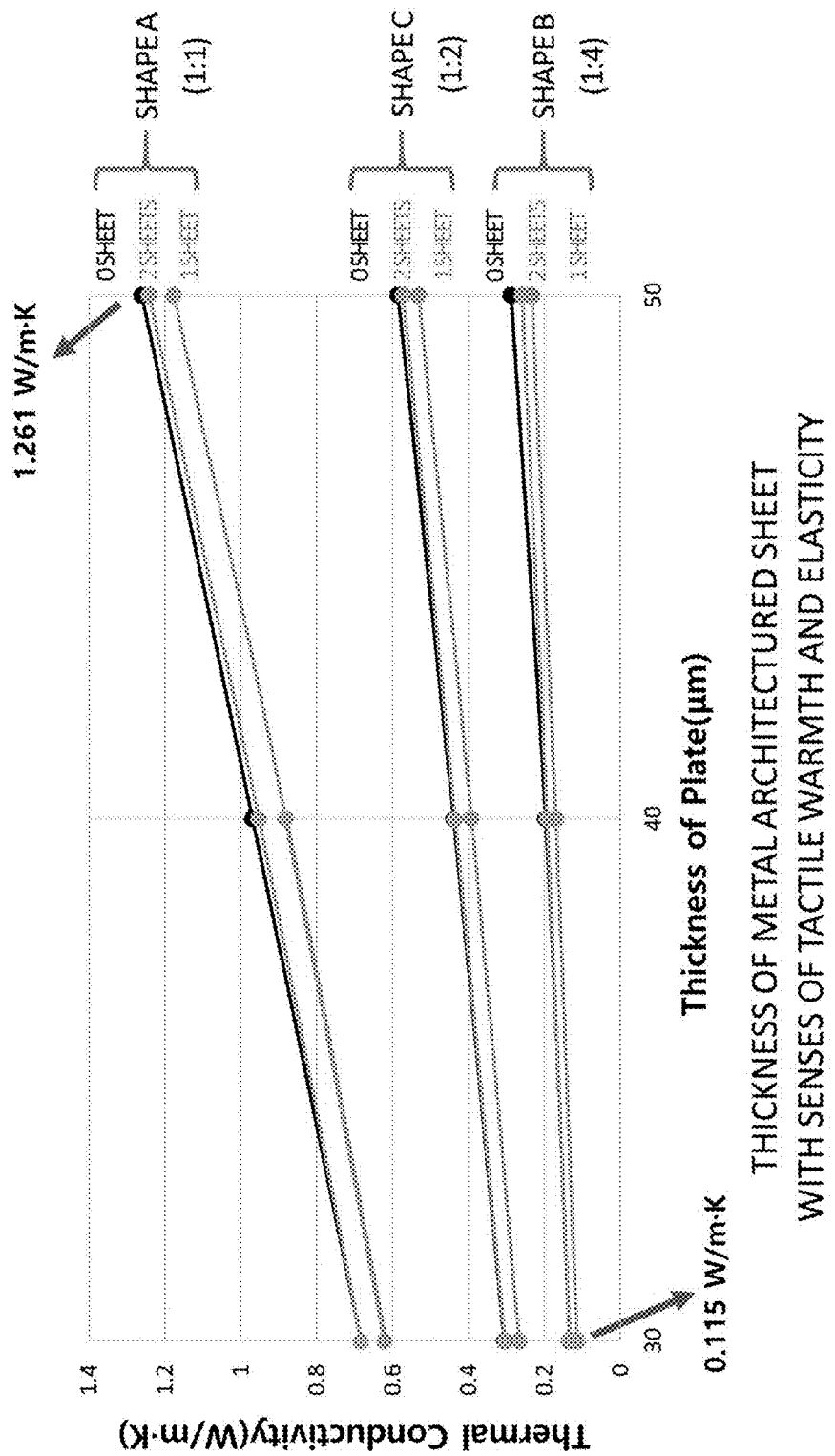
FIG. 14 is a graph showing change in thermal conductivity according to the thickness of the metal architectured plate with senses of tactile warmth and elasticity according to an embodiment of the present disclosure.

FIG. 14 is a graph showing change in thermal conductivity according to the thickness of the metal architectured plate with senses of tactile warmth and elasticity according to an embodiment of the present disclosure.

In the case of FIG. 14, metal architectured sheets with senses of tactile warmth and elasticity were manufactured in a shape A, a shape B, and a shape C by stacking metal architectured materials with senses of tactile warmth and elasticity in which the ratios of the width of the microchannels with senses of tactile warmth and elasticity and the width of base microchannels are 1:1, 1:2, and 1:4, respectively, and thermal conductivity according to thickness change was measured when added metal architectured materials with senses of tactile warmth and elasticity were 0 sheet, 1 sheet, and 2 sheets for each of the shape A, the shape B, and the shape C. As the result of measurement, it was found out that the thermal conductivity of the metal architectured plates with senses of tactile warmth and elasticity had a linear relationship with the thickness.

Figure 15:
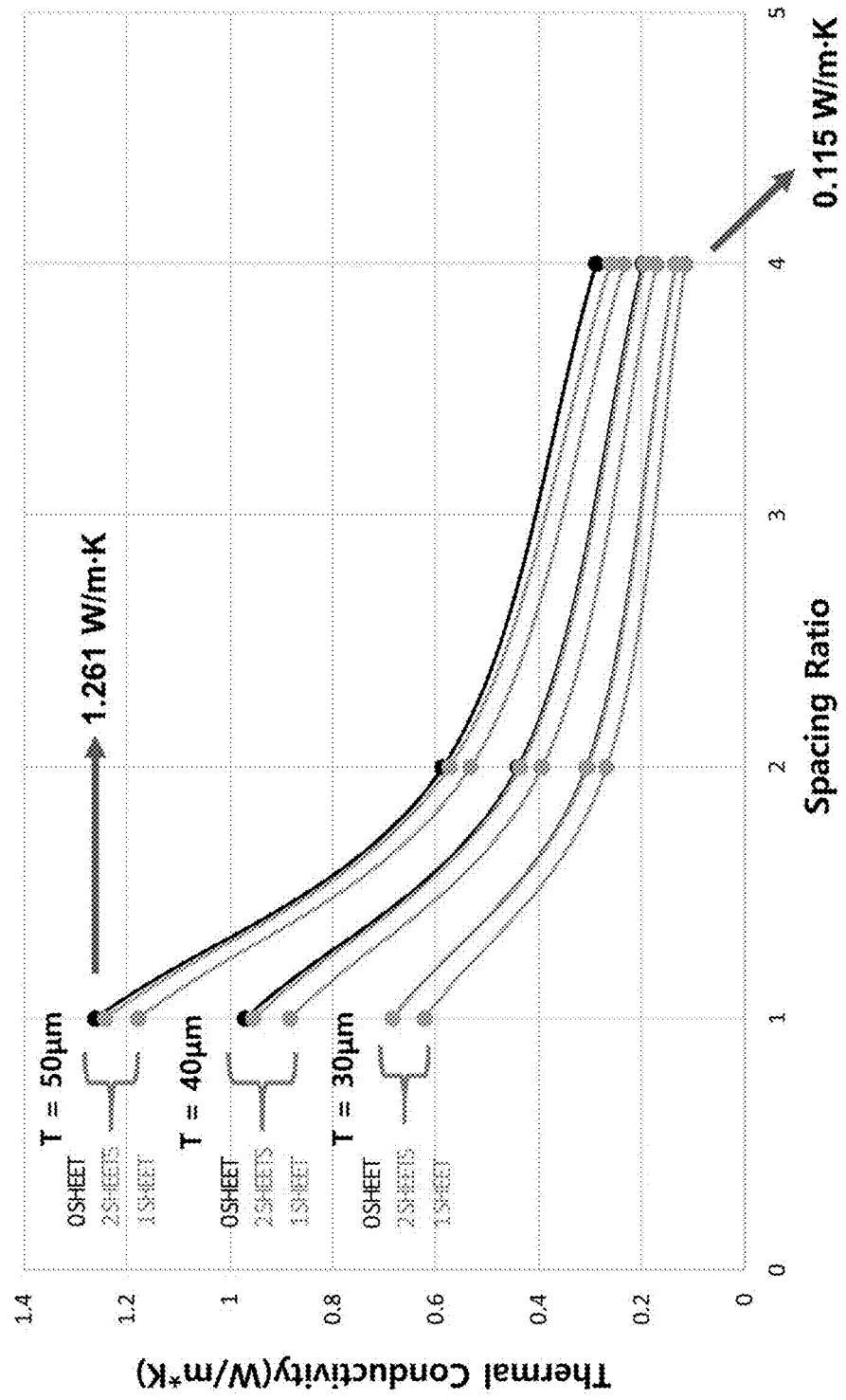
FIG. 15 is a graph showing change in thermal conductivity according to the ratio of the width of the microchannel with senses of tactile warmth and elasticity and the width of the base microchannel in the metal architectured plate with senses of tactile warmth and elasticity according to an embodiment of the present disclosure.

FIG. 15 is a graph showing change in thermal conductivity according to the ratio of the width of the microchannel with senses of tactile warmth and elasticity and the width of the base microchannel in the metal architectured plate with senses of tactile warmth and elasticity according to an embodiment of the present disclosure.

As in FIG. 15, thermal conductivities of metal architectured plates with senses of tactile warmth and elasticity which have thicknesses of 50 μm, 40 μm, and 30 μm, respectively, and in which the ratios of the width of the microchannel with senses of tactile warmth and elasticity and the width of the base microchannel are different were measured.

As the result of measurement, it was observed that the higher the ratio of the width of the microchannel with senses of tactile warmth and elasticity and the width of the base microchannel, the lower the thermal conductivity, so the effect of tactile warmth could be further provided.

Figure 16:
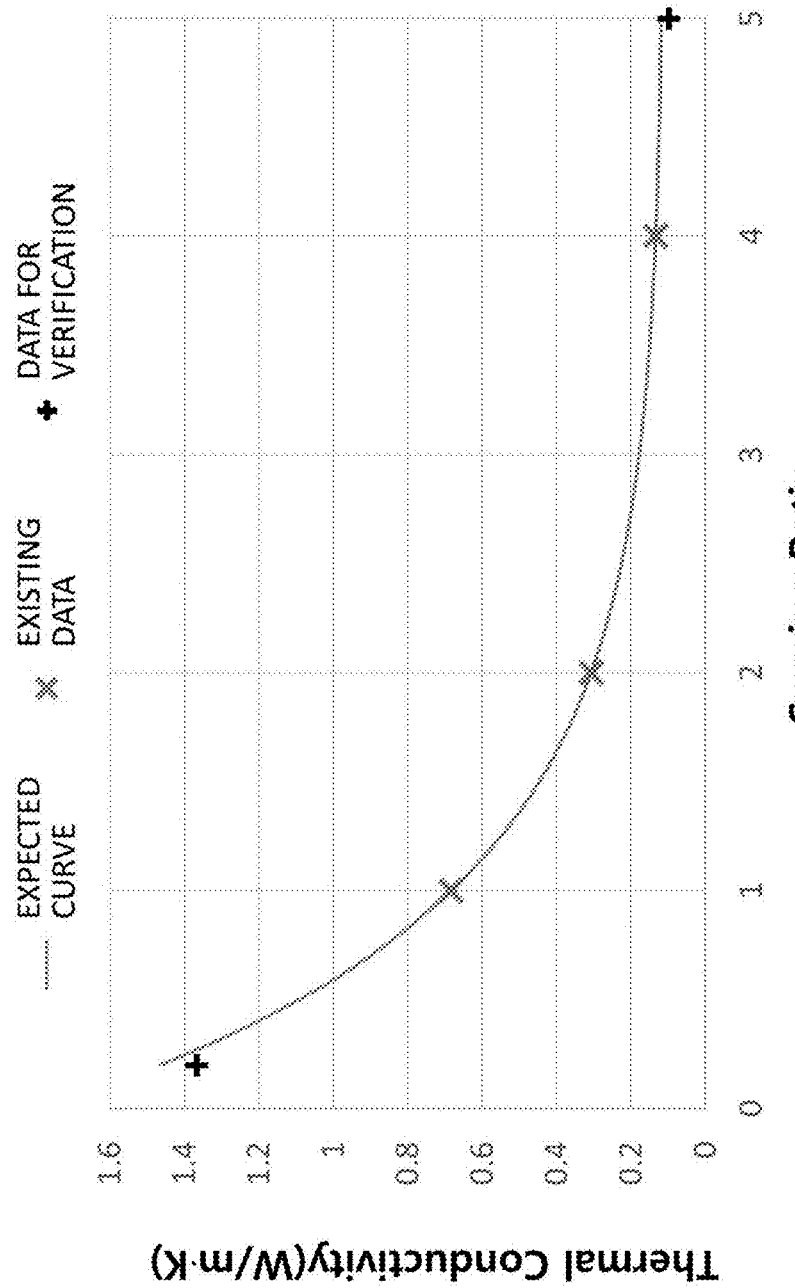
FIG. 16 is a graph showing derivation of a thermal conductivity equation according to the ratio of the width of the microchannel with senses of tactile warmth and elasticity and the width of the base microchannel in the metal architectured plate with senses of tactile warmth and elasticity according to an embodiment of the present disclosure.

FIG. 16 is a graph showing derivation of a thermal conductivity equation according to the ratio of the width of the microchannel with senses of tactile warmth and elasticity and the width of the base microchannel in the metal architectured plate with senses of tactile warmth and elasticity according to an embodiment of the present disclosure.

As in FIG. 16, the metal architectured plate with senses of tactile warmth and elasticity according to an embodiment of the present disclosure may be manufactured to have desired thermal conductivity by adjusting the ratio of the width of the microchannel with senses of tactile warmth and elasticity and the width of the base microchannel.

In this case, assuming that the thermal conductivity of the metal architectured plate with senses of tactile warmth and elasticity was y, the ratio of the width of the microchannel with senses of tactile warmth and elasticity and the width of the base microchannel was x, and a general equation was $y=A(1)e^{-A(2)x}+A(3)$, coefficients could be determined though tests of manufacturing metal architectured plates with senses of tactile warmth and elasticity with the ratio of the width of the microchannel with senses of tactile warmth and elasticity and the width of the base microchannel changed and of repeatedly measuring the thermal conductivity. The coefficients can be determined through Table 1.

Figure 17:
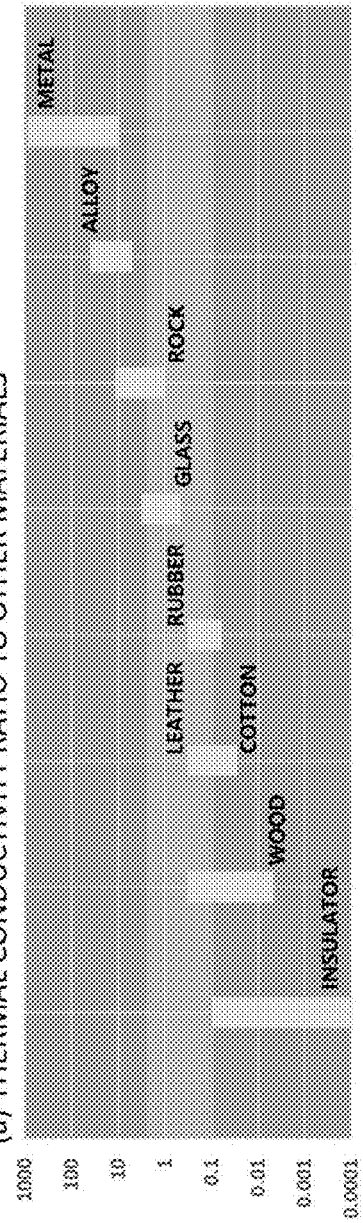
FIG. 17 is a view showing an example of other materials corresponding to tactile warmth according to the thermal conductivity of the metal architectured plate with senses of tactile warmth and elasticity according to an embodiment of the present disclosure.

FIG. 17 is a view showing an example of other materials corresponding to tactile warmth according to the thermal conductivity of the metal architectured plate with senses of tactile warmth and elasticity according to an embodiment of the present disclosure.

(a) of FIG. 17 is a table showing the ratio of thermal conductivity of other materials and a metal architectured plate with senses of tactile warmth and elasticity of the present disclosure, and (b) of FIG. 17 is a table showing thermal conductivity (spacing ratio of 1, 2, and 3, initial data) measured for each thicknesses of the metal architectured materials with senses of tactile warmth and elasticity constituting the metal architectured plate with senses of tactile warmth and elasticity and number of stacks and thermal conductivity (spacing ratio of 0.2 and 5, data for verification of a function) derived using the thermal conductivity derivation equation.

As in FIG. 17, the metal architectured plates with senses of tactile warmth and elasticity according to an embodiment of the present disclosure could be manufactured to have the tactile warmth of materials such as wood, cotton, leather, rubber, glass, rock, or the like.

<Experimental Example 2> Control of Tactile Warmth and Elasticity of Metal Architectured Plate with Senses of Tactile Warmth and Elasticity In order to perform a test of controlling tactile warmth and elasticity of a metal architectured plate with senses of tactile warmth and elasticity of the present disclosure, metal architectured plates with senses of tactile warmth and elasticity were manufactured and used in tests as in the following manufacturing examples and comparative examples.

Manufacturing Example 1

The metal architectured plate with senses of tactile warmth and elasticity according to an embodiment of the present disclosure was manufactured.

In order to manufacture the metal architectured plate with senses of tactile warmth and elasticity, a metal architectured material with senses of tactile warmth and elasticity was manufactured first.

The metal architectured material with senses of tactile warmth and elasticity was manufactured such that the ratio of the width of the microchannel with senses of tactile warmth and elasticity and the width of the base microchannel became 1:4 using electroforming The metal architectured materials with senses of tactile warmth and elasticity manufactured as described above were stacked in six layers using soldering and a sheet member was stacked on the uppermost layer and the lowermost layer, whereby a metal architectured plate with senses of tactile warmth and elasticity was completed.

Manufacturing Example 2

A metal architectured plate with senses of tactile warmth and elasticity was manufactured in the same way as the manufacturing example 1 except that the metal architectured materials with senses of tactile warmth and elasticity were stacked in five layers.

Comparative Example 1

A metal architectured plate with senses of tactile warmth and elasticity was manufactured in the same way as the manufacturing example 1 except that the ratio of the width of the microchannel with senses of tactile warmth and elasticity and the width of the base microchannel was 1:1.

Experimental Example 2-1

A test of checking the tactile warmth of the metal architectured plates with senses of tactile warmth and elasticity manufactured in the manufacturing example 1 and the comparative example was performed.

To this end, the thermal conductivity of the metal architectured plates with senses of tactile warmth and elasticity manufactured in the manufacturing example and the comparative example was measured.

Figure 18:
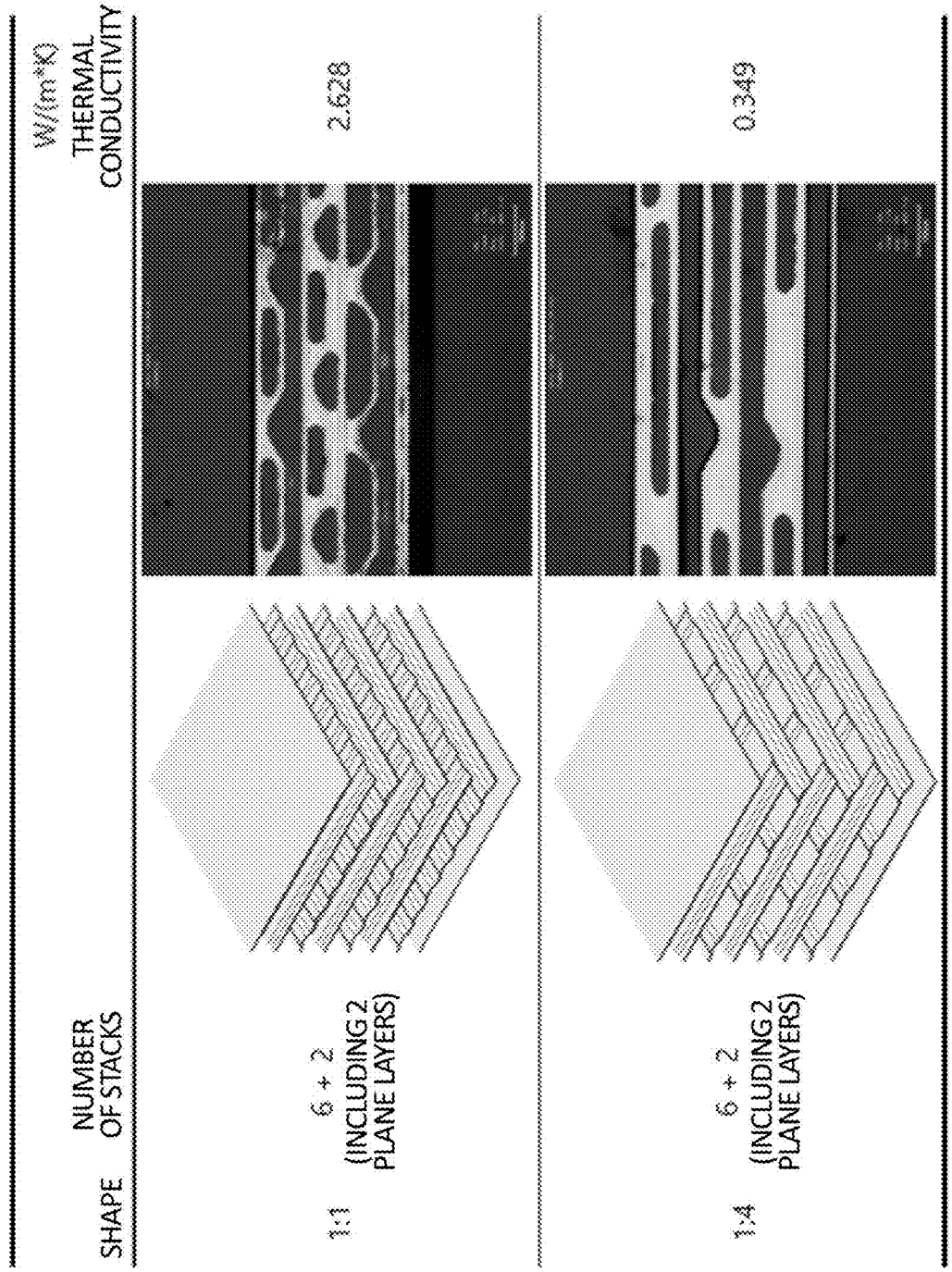
FIG. 18 is a table showing a cross-sectional structure and measured thermal conductivity of a metal architectured plate with senses of tactile warmth and elasticity of the present disclosure.

FIG. 18 is a table showing cross-sectional structures and measured thermal conductivity of metal architectured plates with senses of tactile warmth and elasticity manufactured in accordance with the manufacturing example and the comparative example of the present disclosure.

Referring to FIG. 18, it could be seen that it is possible to control such that the metal architectured plate with senses of tactile warmth and elasticity could have thermal conductively close to those of natural matters by adjusting the ratio of widths of a microchannel with senses of tactile warmth and elasticity and a base microchannel in accordance with an embodiment of the present disclosure.

<Experimental Example 2-2>

A test of checking the tactile elasticity of the metal architectured plate with senses of tactile warmth and elasticity manufactured in the manufacturing example 2 was performed.

To this end, the elastic modulus of the metal architectured plate with senses of tactile warmth and elasticity manufactured in the manufacturing example 2 was measured.

Figure 19:
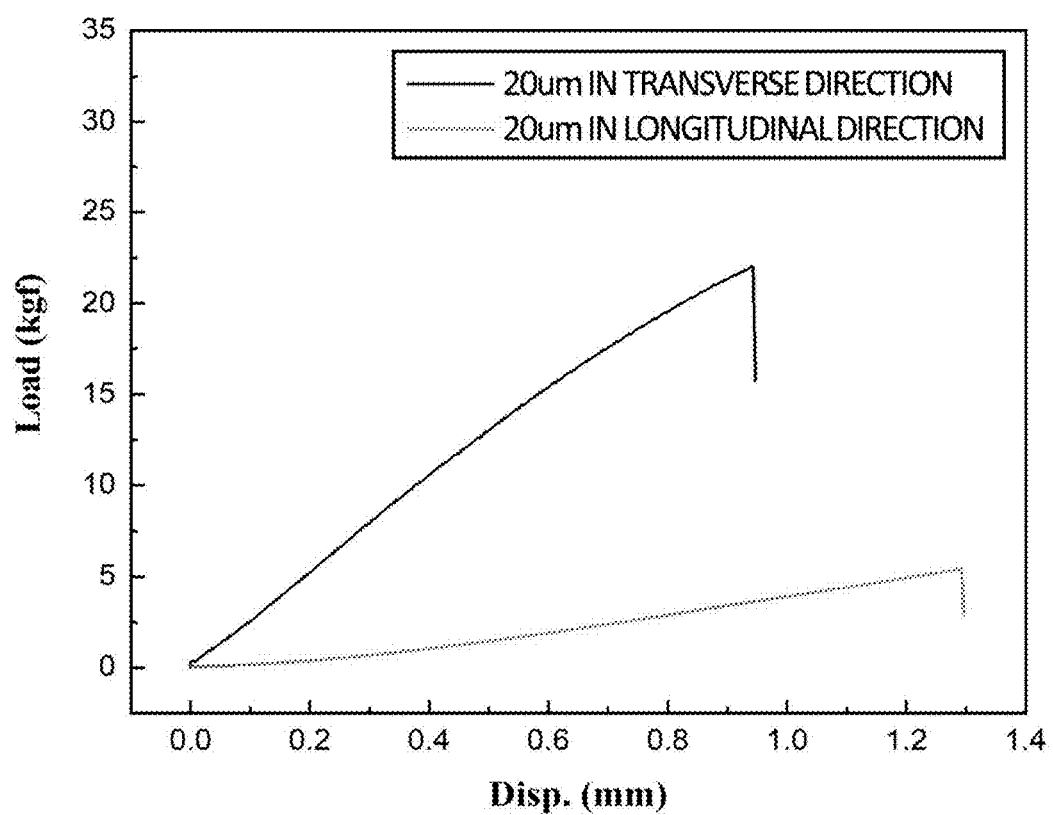
FIG. 19 is a graph showing tension test results by direction of a metal architectured plate with senses of tactile warmth and elasticity of the present disclosure.

FIG. 19 is a graph showing tension test results by direction of a metal architectured plate with senses of tactile warmth and elasticity manufactured in accordance with the manufacturing example 2 of the present disclosure.

Referring to FIG. 19, it could be seen that the elastic modulus of the metal architectured plate with senses of tactile warmth and elasticity according to an embodiment of the present disclosure was low as 0.48 Mpa that was about 1/500,000 of solid metals not having a channel. That is, it could be seen that it was possible to control an elastic modulus by manufacturing and stacking metal architectured materials with senses of tactile warmth and elasticity by controlling various factors, such as the ratio of the widths of the metal architectured plate with senses of tactile warmth and elasticity of the present disclosure, the width of the ridge, and the contact angle, and accordingly, the metal architectured plate with senses of tactile warmth and elasticity could be manufactured to have desired tactile warmth close to those of natural matters.

The above description is provided as an exemplary embodiment of the present disclosure, and it should be understood that the present disclosure may be easily modified in other various ways without changing the spirit or the necessary features of the present disclosure by those skilled in the art. Therefore, the embodiments described above are only examples and should not be construed as being limitative in all respects. For example, the components described as single parts may be divided and the components described as separate parts may be integrated.

The scope of the present disclosure is defined by the following claims, and all of changes and modifications obtained from the meaning and range of claims and equivalent concepts should be construed as being included in the scope of the present disclosure.

REFERENCE SIGNS LIST 1, 2, 3: Metal architectured plate with senses of tactile warmth and elasticity
10: Metal architectured material with senses of tactile warmth and elasticity
11: First metal architectured material with senses of tactile warmth and elasticity
12: Second metal architectured material with senses of tactile warmth and elasticity
20: Metal architectured material with senses of tactile warmth and elasticity
30: Metal sheet material
40: Spacer 100: Microchannel with senses of tactile warmth and elasticity
101: Width of microchannel with senses of tactile warmth and elasticity
102: Ridge
103: Width of ridge
104: Slope
105: Contact angle
106: Height
110: Second microchannel with senses of tactile warmth and elasticity
111: Width of second microchannel with senses of tactile warmth and elasticity
112: Second ridge
113: Width of second ridge
114: Second slope
115: Second contact angle
116: Second height
200: Base microchannel
201: Width of base microchannel
300: Channel with senses of tactile warmth and elasticity

The invention claimed is:

1. A metal architectured plate with senses of tactile warmth and elasticity, the metal architectured plate comprising:
a stack of sheet metal architectured materials having micro-thickness with senses of tactile warmth and elasticity, the metal architectured materials including base microchannels formed with regular intervals; and microchannels with senses of tactile warmth and elasticity that protrude between the base microchannels, such that the base microchannels and the microchannels with senses of tactile warmth and elasticity form channels with senses of tactile warmth and elasticity, which are spaces for allowing control of thermal conductivity and an elastic modulus,
wherein a thermal conductivity of an entire thickness the architectured plate including the microchannels is 0.05 W/m·K to 10 W/m·K.

2. The metal architectured plate of claim 1, wherein the sheet metal architectured materials have a thickness of from 3 μm to 100 μm.

3. The metal architectured plate of claim 1, wherein the ratio of the width of the microchannels with senses of tactile warmth and elasticity and the width of the base microchannels is 1:10 to 10:1.

4. The metal architectured plate of claim 1, wherein the microchannels with senses of tactile warmth and elasticity includes:
a pair of slopes protruding at a predetermined contact angle from ends of each side of the base microchannel; and
a ridge connecting ends of the pair of slopes that are opposite to the ends connected to the base microchannel.

5. The metal architectured plate of claim 4, wherein the width of the base microchannel is 5 μm to 5000 μm.

6. The metal architectured plate of claim 4, wherein the width of the ridge is 1 μm to 4000 μm.

7. The metal architectured plate of claim 4, wherein the contact angle is an angle made by the slope and the ridge or the base microchannels and is 0° to 90°.

8. The metal architectured plate of claim 4, wherein the sheet metal architectured materials with senses of tactile warmth and elasticity are stacked such that respective ridges of the microchannels with senses of tactile warmth and elasticity of one metal architectured material with senses of tactile warmth and elasticity are in contact with respective bottoms of the base microchannels of another metal architectured material with senses of tactile warmth and elasticity to form the channel with senses of tactile warmth and elasticity.

9. A metal architectured plate with senses of tactile warmth and elasticity, the metal architectured plate comprising a stack of metal architectured materials having micro-thickness,
wherein each of the metal architectured materials with senses of tactile warmth and elasticity includes: a plurality of base microchannels formed with regular intervals; and a plurality of first microchannels with senses of tactile warmth and elasticity that are formed to protrude between the base microchannels,
the first microchannels with senses of tactile warmth and elasticity are formed in a stepped shape including second microchannels with senses of tactile warmth and elasticity protruding from the first microchannels with senses of tactile warmth and elasticity, and
the metal architectured materials with senses of tactile warmth and elasticity are stacked such that the first microchannels with senses of tactile warmth and elasticity are spaced apart so as not to overlap each other,
wherein the first microchannels with senses of tactile warmth and elasticity each include:
a pair of first slopes protruding at a predetermined contact angle from ends of each side of the base microchannel; and
a first ridge connecting ends of the pair of first slopes that are opposite to the ends connected to the base microchannel, and
wherein the second microchannels with senses of tactile warmth and elasticity include:
a pair of second slopes protruding at a predetermined contact angle from the first ridge; and
a second ridge connecting ends of the pair of second slopes that are opposite to the ends connected to the first ridge,
wherein a thermal conductivity of an entire thickness the architectured plate including the first and second microchannels is 0.05 W/m·K to 10 W/m·K.

10. The metal architectured plate of claim 9, wherein the metal architectured materials with senses of tactile warmth and elasticity have a plurality of microchannels with senses of tactile warmth and elasticity sequentially repeatedly protrude from the second microchannel with senses of tactile warmth and elasticity to be formed in a stepped shape in the same way that the second microchannel with senses of tactile warmth and elasticity protrudes from the first microchannel with senses of tactile warmth and elasticity.

11. The metal architectured plate of claim 9, wherein the metal architectured materials with senses of tactile warmth and elasticity are stacked such that the second ridge of one metal architectured material with senses of tactile warmth and elasticity is in contact with the bottom of the base microchannel of another metal architectured material with senses of tactile warmth and elasticity to form the channel with senses of tactile warmth and elasticity.

12. The metal architectured plate of claim 10, wherein the thickness of the metal architectured material with senses of tactile warmth and elasticity is 10 μm to 100 μm.

13. The metal architectured plate of claim 9, wherein the architectured plate has an elastic modulus of 0.1 Mpa to 10 Gpa.

14. The metal architectured plate of claim 1, wherein the stack of sheet metal architectured materials comprises a plurality of first layers alternately stacked with a plurality of second layers,
- in the first layers, the ratio of the width of the microchannel with senses of tactile warmth and elasticity and the width of the base micro channel in a portion of each first layer is 1:2n−1,
- in the second layers, the ratio of the width of the microchannel with senses of tactile warmth and elasticity and the width of the base microchannel in a portion of each second layer is 1:2n, and
- n is an integer of 1 or more.

15. The metal architectured plate of claim 1, wherein at least a portion of the microchannels with senses of tactile warmth and elasticity comprise flat surfaces which contact adjacent base microchannels.

* * * * *